(12) United States Patent
Nakhla et al.

(10) Patent No.: US 12,703,273 B2
(45) Date of Patent: Aug. 11, 2026

(54) CHILD RESTRAINT

(71) Applicant: Dorel Juvenile Group, Inc., Foxboro, MA (US)

(72) Inventors: Said S. Nakhla, Daphne, AL (US); Derek Bonta, Foxboro, MA (US); Darrin Keiser, Foxboro, MA (US); Grant M. Mason, Wrentham, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 120 days.

(21) Appl. No.: 18/659,422

(22) Filed: May 9, 2024

(65) Prior Publication Data

US 2024/0375561 A1 Nov. 14, 2024

Related U.S. Application Data

(60) Provisional application No. 63/542,166, filed on Oct. 3, 2023, provisional application No. 63/465,351, filed on May 10, 2023.

(51) Int. Cl.
*B60N 2/28* (2006.01)

(52) U.S. Cl.
CPC ......... *B60N 2/2869* (2013.01); *B60N 2/2821* (2013.01); *B60N 2/286* (2013.01); *B60N 2/2863* (2013.01)

(58) Field of Classification Search
CPC .................................................... B60N 2/2869
See application file for complete search history.

(56) References Cited

U.S. PATENT DOCUMENTS

| | | | |
|---|---|---|---|
| 2,148,187 | A | 2/1939 | Burnham |
| 7,338,122 | B2 | 3/2008 | Hei |
| D592,109 | S | 5/2009 | Loew |
| D594,678 | S | 6/2009 | Loew |
| 7,740,313 | B1 | 6/2010 | Hei |
| 7,770,970 | B2 | 8/2010 | Hei |
| 8,182,033 | B2 | 5/2012 | Hei |
| 8,210,550 | B2 | 7/2012 | White |
| 8,235,465 | B2 | 8/2012 | Hei |
| 8,256,841 | B2 | 9/2012 | Hei |
| D683,974 | S | 6/2013 | Leys |
| 8,511,749 | B2 | 8/2013 | Hei |
| 8,534,751 | B2 | 9/2013 | Hei |

(Continued)

FOREIGN PATENT DOCUMENTS

| | | | | |
|---|---|---|---|---|
| CN | 119329383 A | * | 1/2025 | ............... B60N 2/28 |
| CN | 120116825 A | * | 6/2025 | ........... B60N 2/2821 |

(Continued)

OTHER PUBLICATIONS

European Search Report for EP24175023.1 dated Sep. 18, 2024, CO-1297 EP || 20341-409643, 10 pages.

(Continued)

*Primary Examiner* — Timothy J Brindley
(74) *Attorney, Agent, or Firm* — Barnes & Thornburg LLP

(57) ABSTRACT

A child restraint includes a seat base configured to be secured to a vehicle seat and a juvenile seat configured to mount to the seat base and defining a child-receiving space adapted to hold and secure a child for transportation in a vehicle. The juvenile seat is pivotable relative to the seat base between various arrangements.

20 Claims, 24 Drawing Sheets

(56) References Cited

U.S. PATENT DOCUMENTS

| | | | | |
|---|---|---|---|---|
| 8,696,063 | B2 | 4/2014 | Rattenbury | |
| 8,702,169 | B2 * | 4/2014 | Abadilla | B60N 2/2869 297/256.16 |
| 8,714,582 | B2 | 5/2014 | Hei | |
| 9,481,389 | B2 | 11/2016 | Leys | |
| 10,449,876 | B2 | 10/2019 | Lonstein | |
| 10,464,451 | B2 | 11/2019 | Stamper | |
| 11,370,334 | B2 | 6/2022 | Mo | |
| 2021/0078463 | A1 | 3/2021 | Mo | |
| 2024/0083311 | A1 * | 3/2024 | Chen | B60N 2/2869 |
| 2024/0116411 | A1 * | 4/2024 | Erel Caglar | B60N 2/2806 |
| 2024/0208377 | A1 | 6/2024 | Hartenstine | |
| 2024/0270132 | A1 * | 8/2024 | Toonders | B60N 2/06 |
| 2024/0375562 | A1 * | 11/2024 | Zhang | B60N 2/919 |
| 2025/0135968 | A1 * | 5/2025 | Fuerstenberg | B60N 2/2821 |

FOREIGN PATENT DOCUMENTS

| | | | | |
|---|---|---|---|---|
| DE | 19744978 | C2 | 3/2003 | |
| DE | 202024105049 | U1 * | 10/2024 | B60N 2/2869 |
| GB | 2634149 | A * | 4/2025 | B60N 2/2845 |
| WO | 2023026547 | A1 | 3/2023 | |
| WO | 2023036964 | A1 | 3/2023 | |

OTHER PUBLICATIONS

European Office Action for EP24175023.1 dated Oct. 27, 2025, CO-1297 EP || 20341-409643), 5 pages.

* cited by examiner

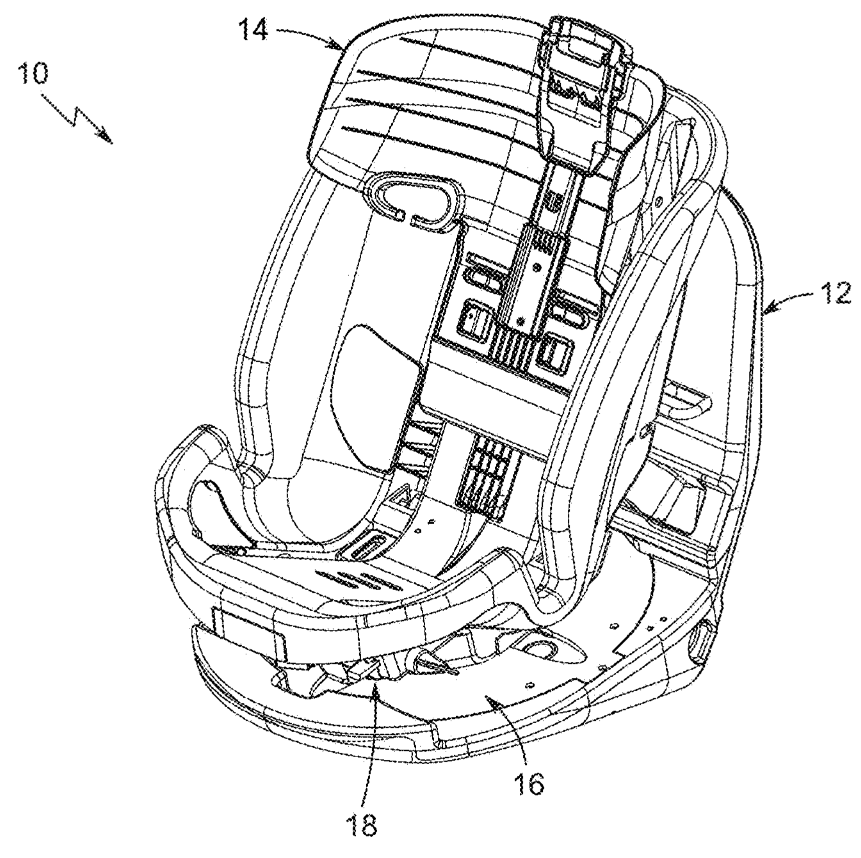
FIG. 1
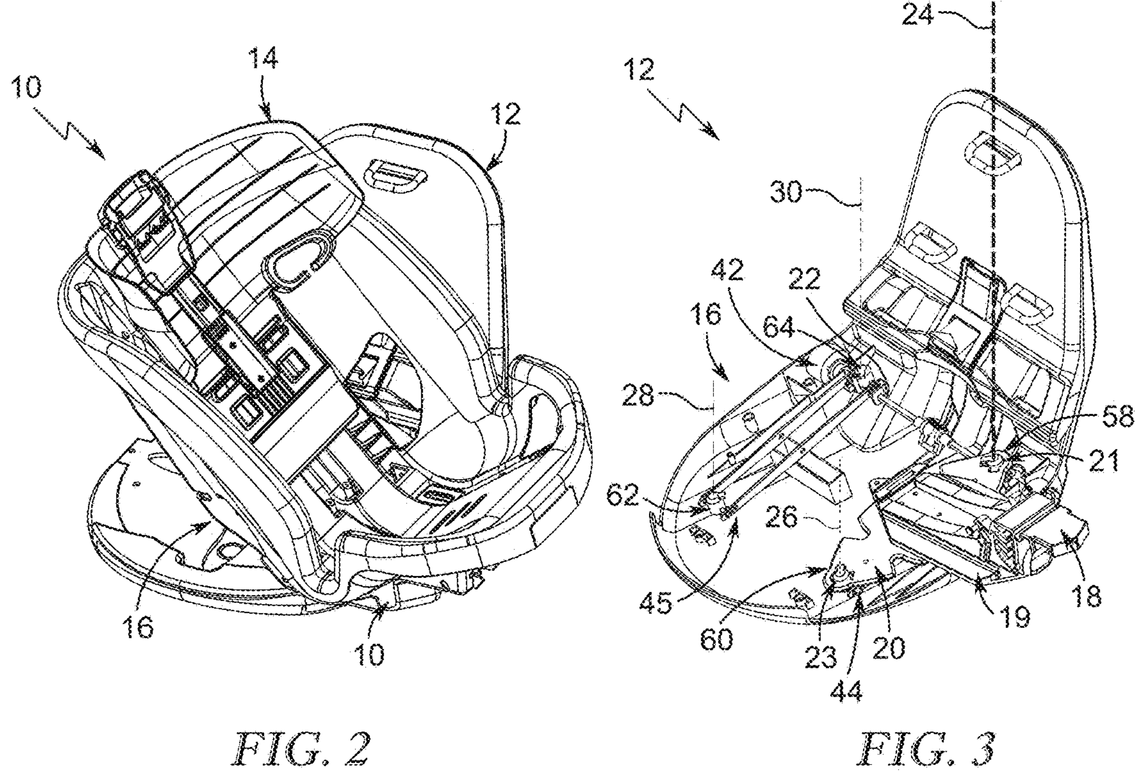
FIG. 2
FIG. 3

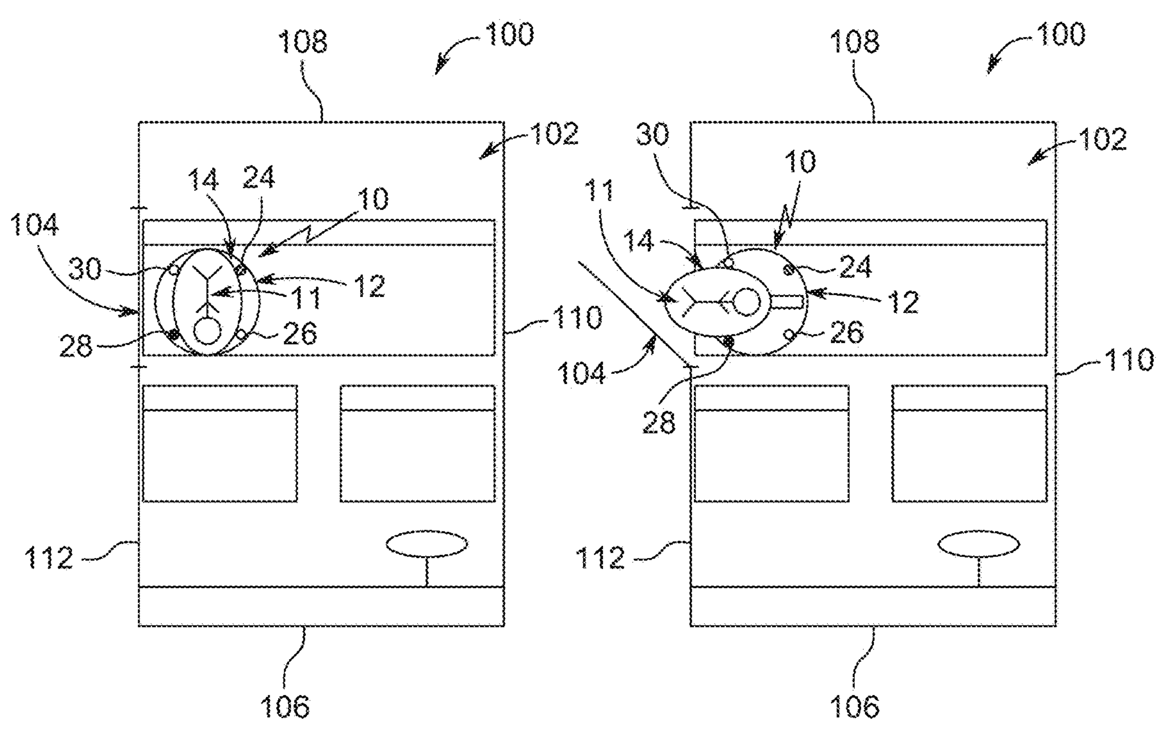
FIG. 4A
FIG. 4B
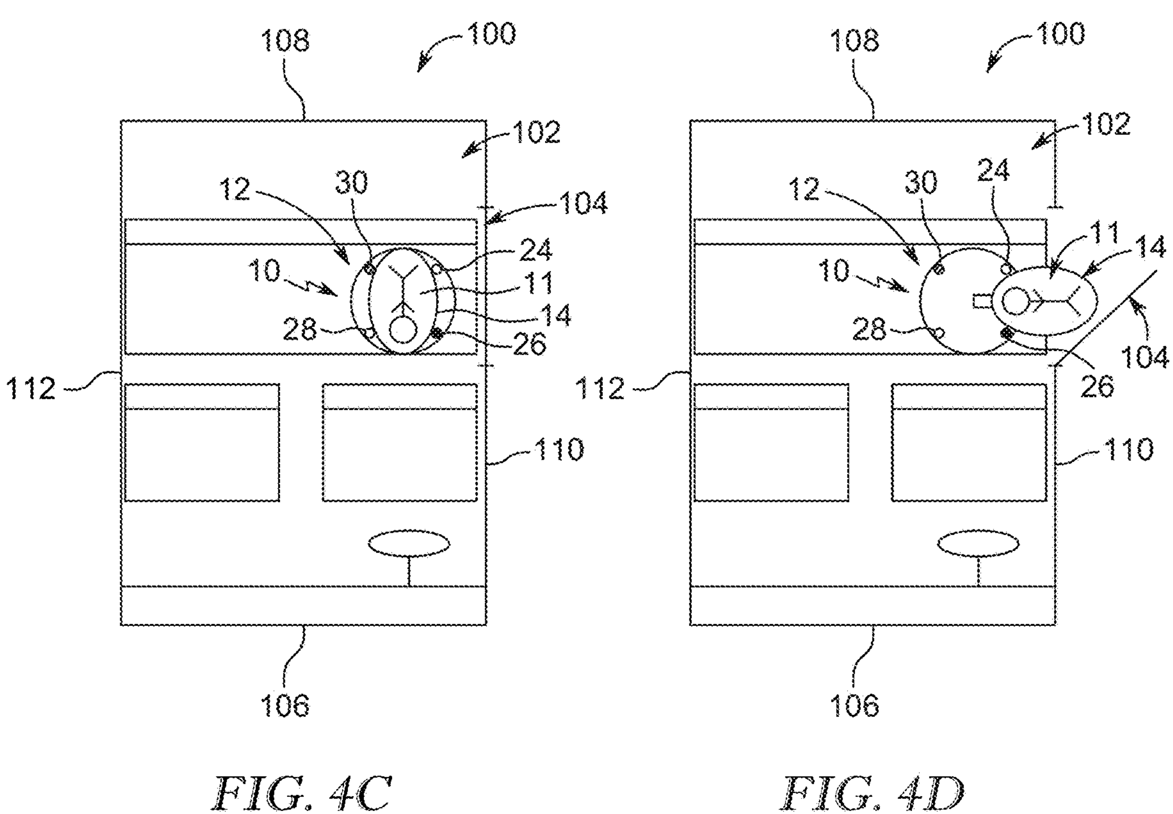
FIG. 4C
FIG. 4D

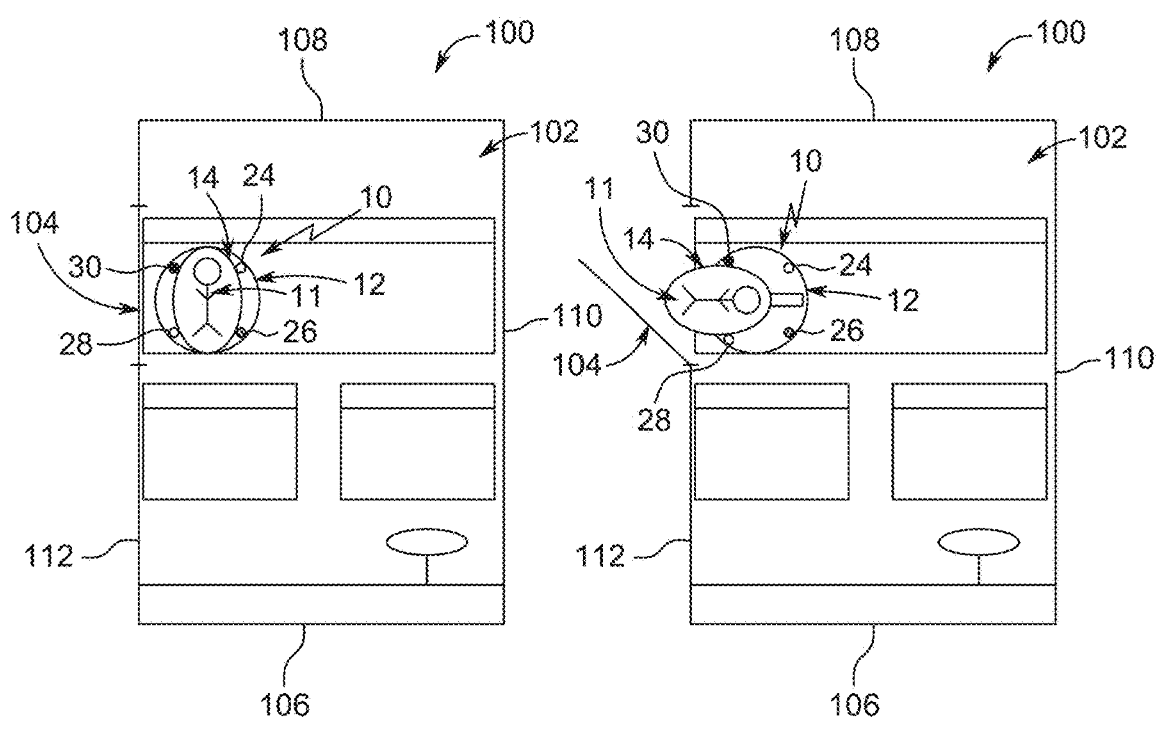
FIG. 5A
FIG. 5B
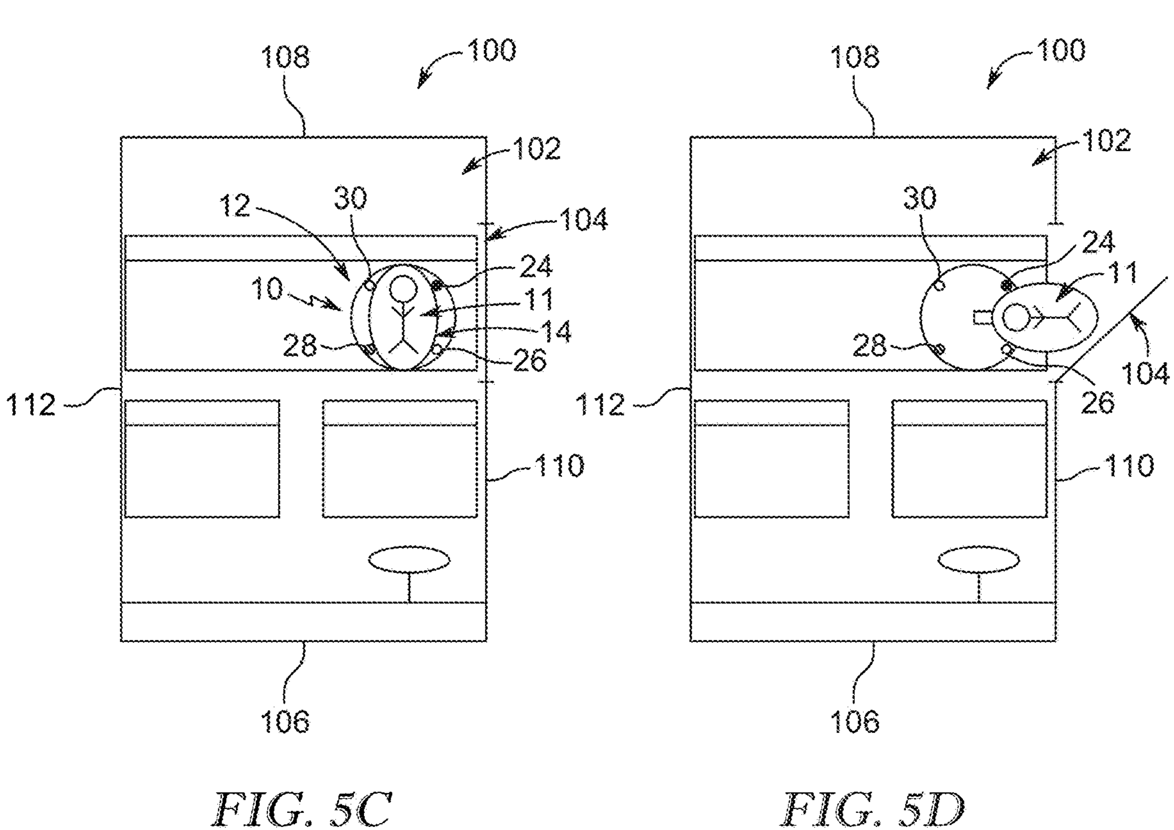
FIG. 5C
FIG. 5D

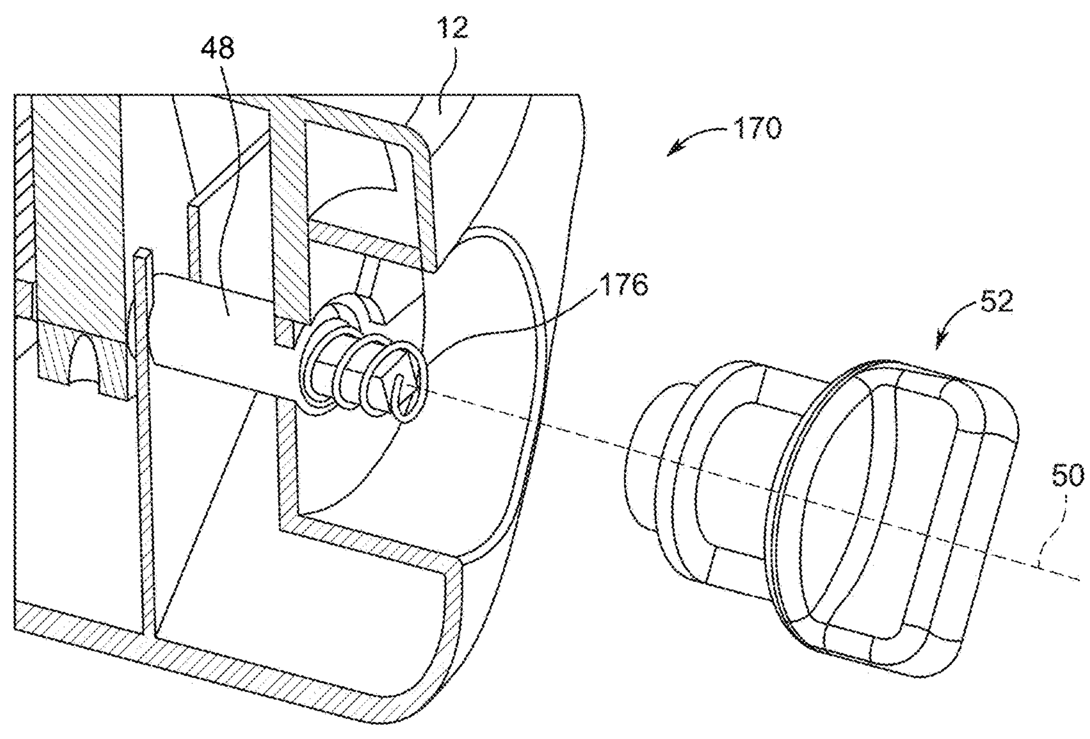
FIG. 16
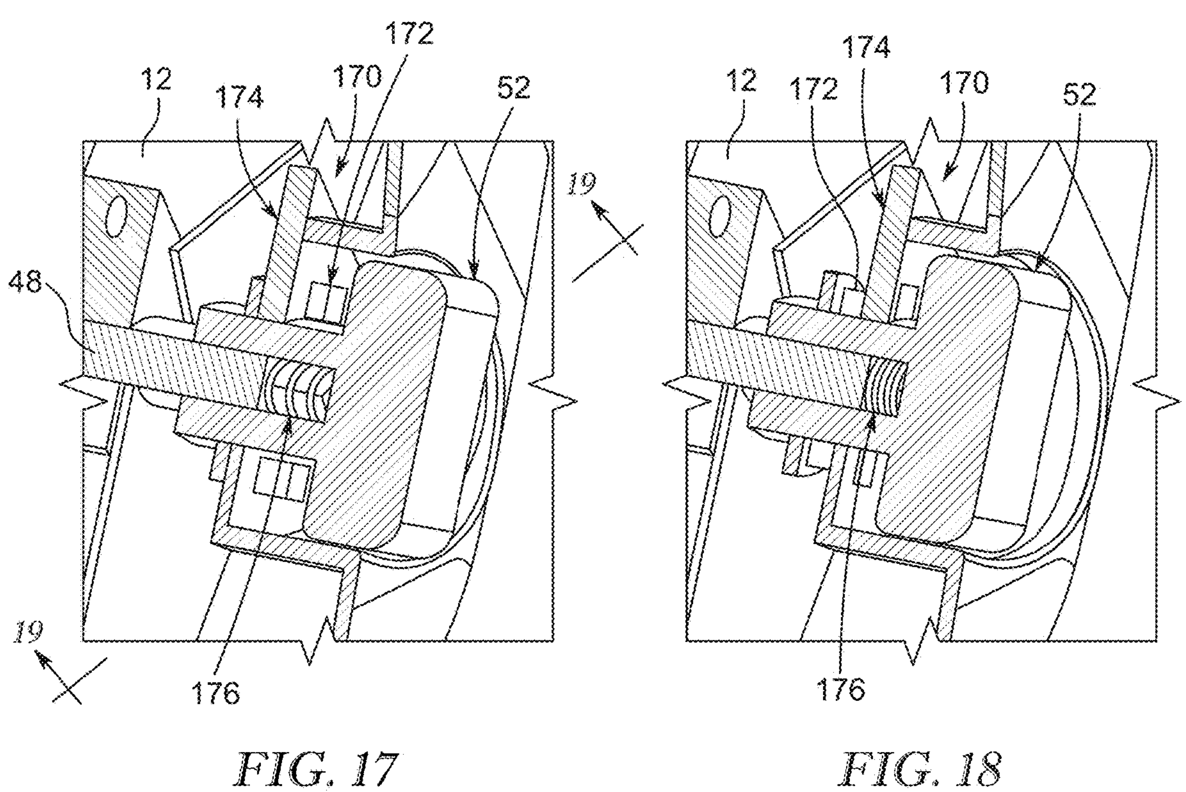
FIG. 17
FIG. 18

CHILD RESTRAINT

PRIORITY CLAIM

This application claims priority under 35 U.S.C. § 119 (e) to U.S. Provisional Patent Application No. 63/465,351, filed May 10, 2023, and to U.S. Provisional Patent Application No. 63/542,166, filed Oct. 3, 2023, the disclosure each of which is expressly incorporated by reference herein in its entirety.

BACKGROUND

The present disclosure relates to a child safety device, and particularly to a child seat. More particularly, the present disclosure relates to a child seat for use in a vehicle.

SUMMARY

According to the present disclosure, a child restraint includes a seat base and a juvenile seat coupled to the seat base. The seat base is configured to be secured to a vehicle seat. The juvenile seat is configured to support and secure a child to the child restraint for transportation in the vehicle.

In illustrative embodiments, the child restraint further includes a seat-pivot unit coupled to the seat base and configured to provide multi-axis pivoting means for the juvenile seat to move relative to the seat base. The seat-pivot unit allows selection of one out of up to four pivot axes to allow movement of the juvenile seat between a forward-facing arrangement, a rearward-facing arrangement, a first pivoted arrangement, and a second pivoted arrangement. In the first and second pivoted arrangements, the juvenile seat is at least partially offset from the seat base toward a door of the vehicle so that a caregiver can more easily place or remove the child into or out of the juvenile seat.

In illustrative embodiments, the seat pivot unit includes a juvenile-seat carrier configured to mount the juvenile seat to the seat base, a plurality of pivot rods, and a rod actuator. The rod actuator is movable relative to the seat base between two or more positions to cause one of the pivot rods included in the plurality of pivot rods to engage with the juvenile-seat carrier and establish a selected pivot axis about which the juvenile seat rotates.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a is a perspective view of a child restraint, in accordance with the present disclosure, including a seat base, a juvenile seat configured to be mounted on the seat base, and a seat-pivot unit providing multi-axis pivoting means for the juvenile seat to pivot relative to the seat base so that a child can more easily be loaded and unloaded into the juvenile seat as shown in FIG. 2;

FIG. 2 is a perspective view of the child restraint in a pivoted arrangement in which the juvenile seat faces toward a lateral side of the vehicle and is at least partially offset from the seat base toward the lateral side of the vehicle as a result of the juvenile seat pivoting about a selected, off-center pivot axis included in the multi-axis pivoting means as shown in FIG. 3;

Figure 6:
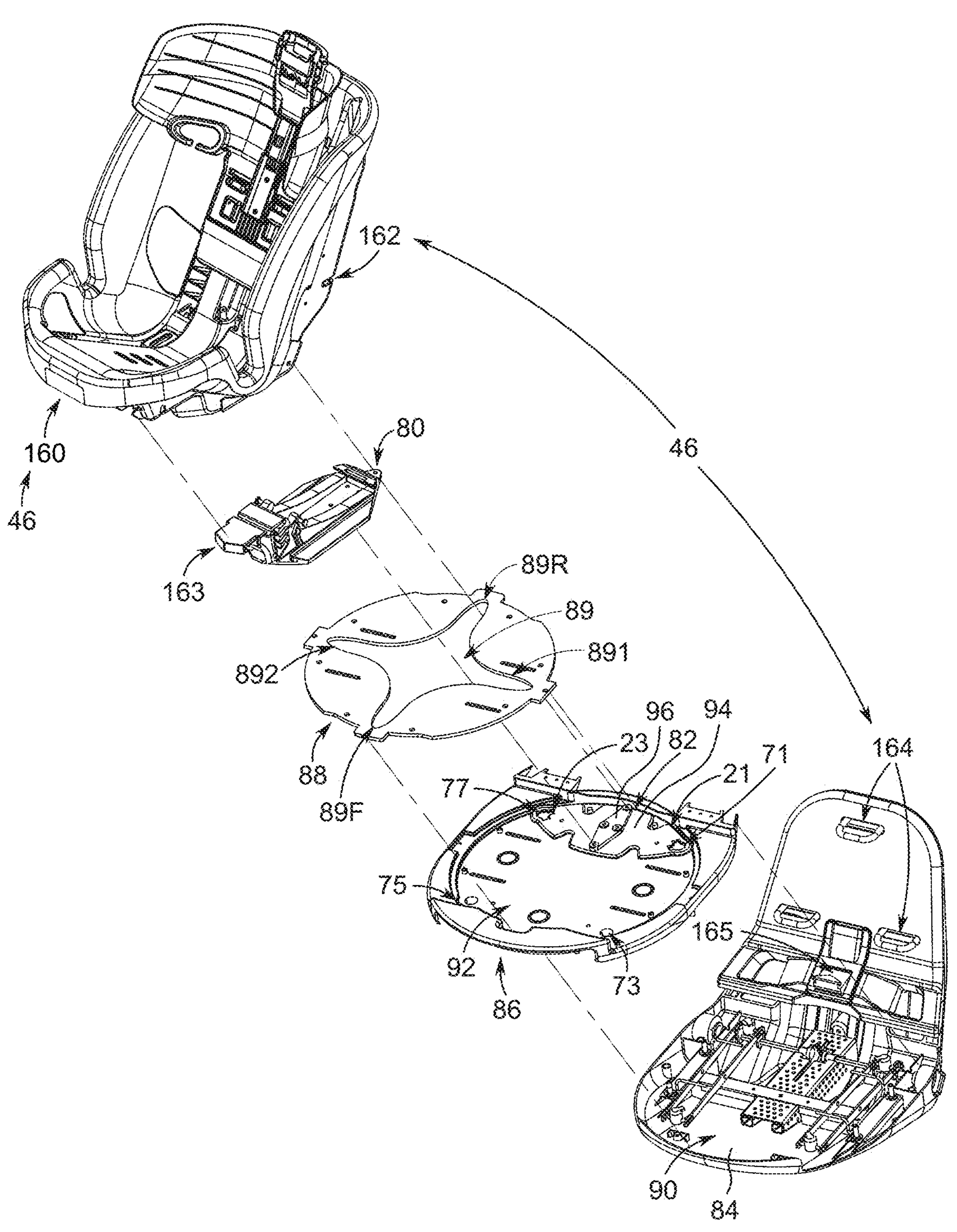
Figures 7, 8:
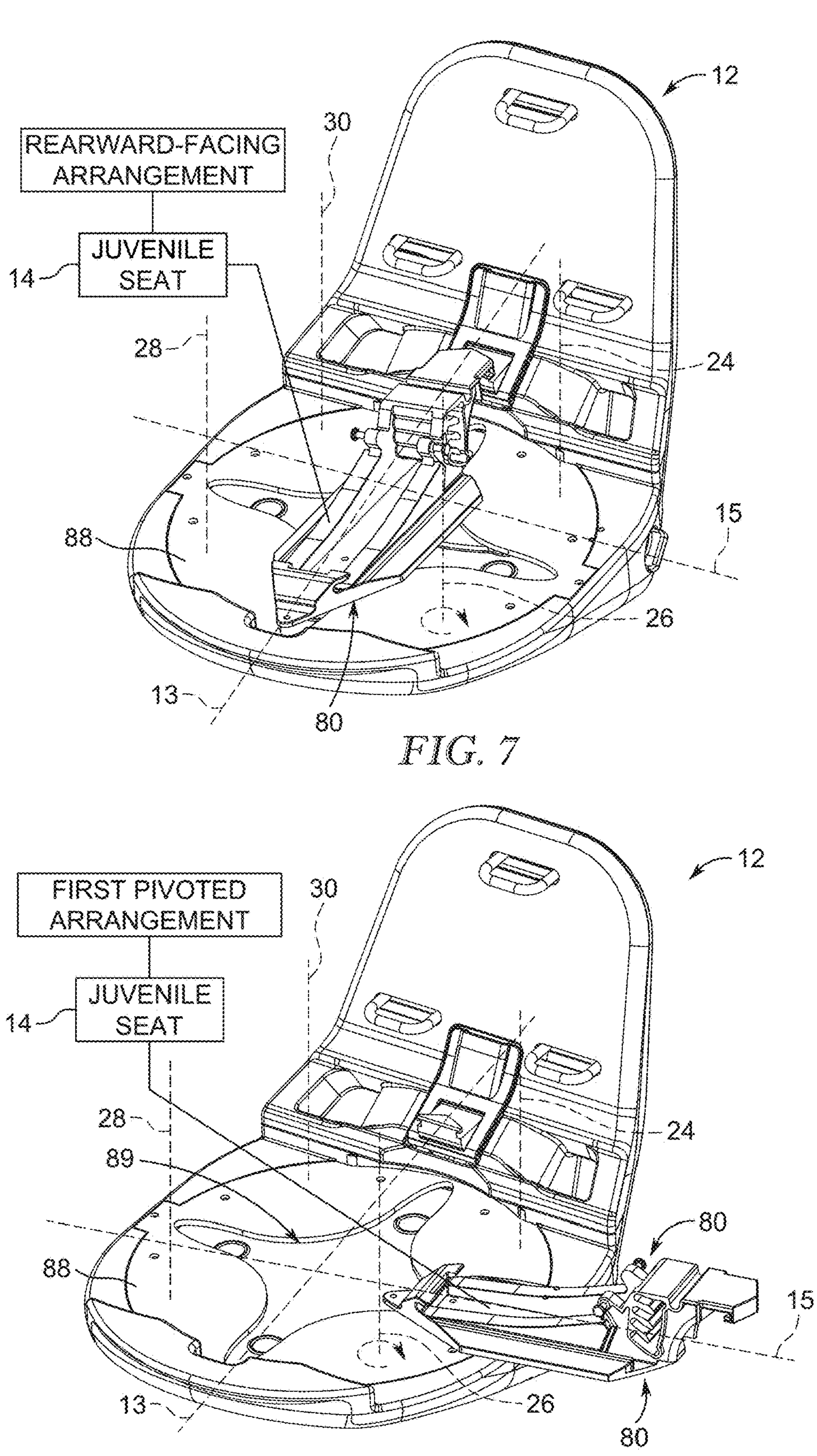
Figure 9:
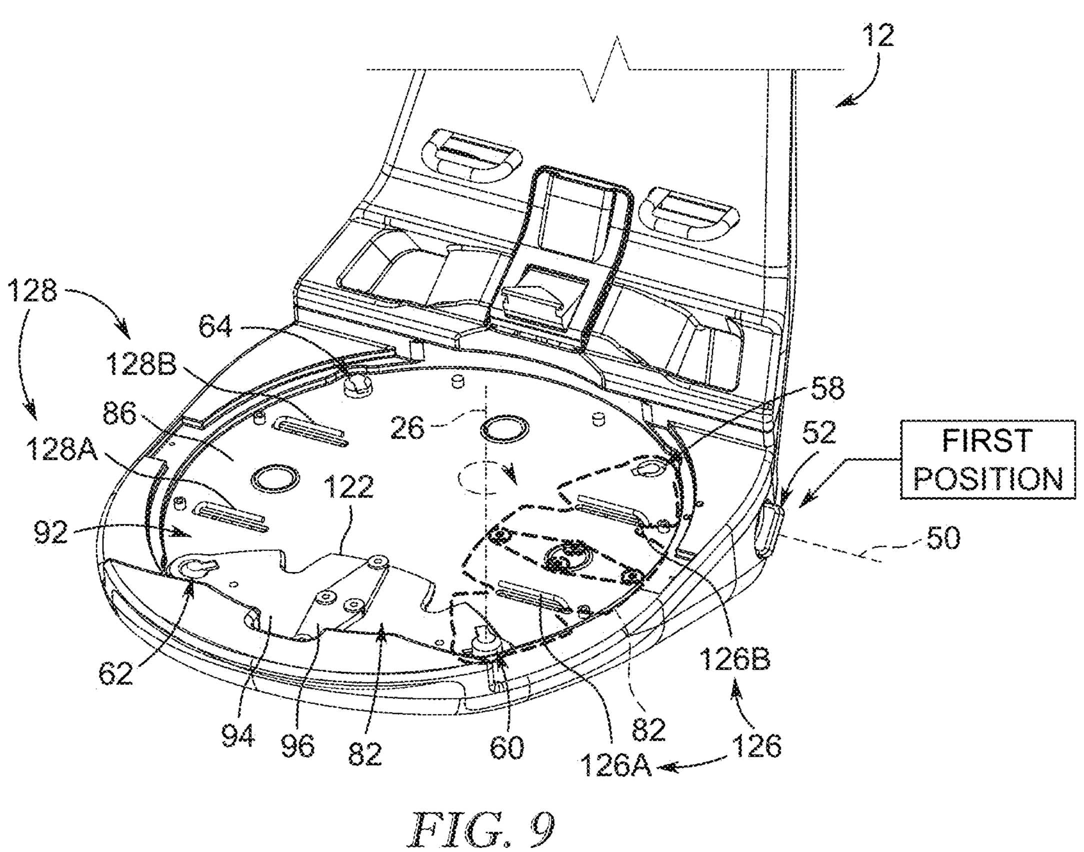
Figure 10:
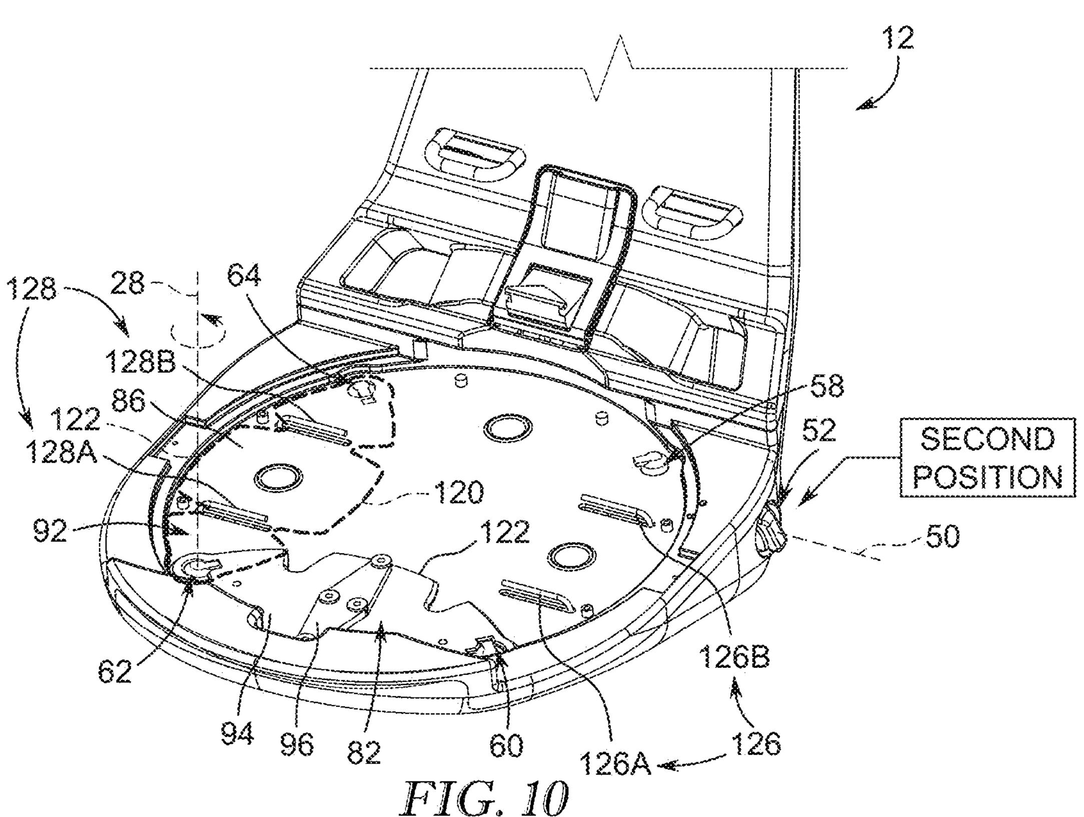
Figure 11:
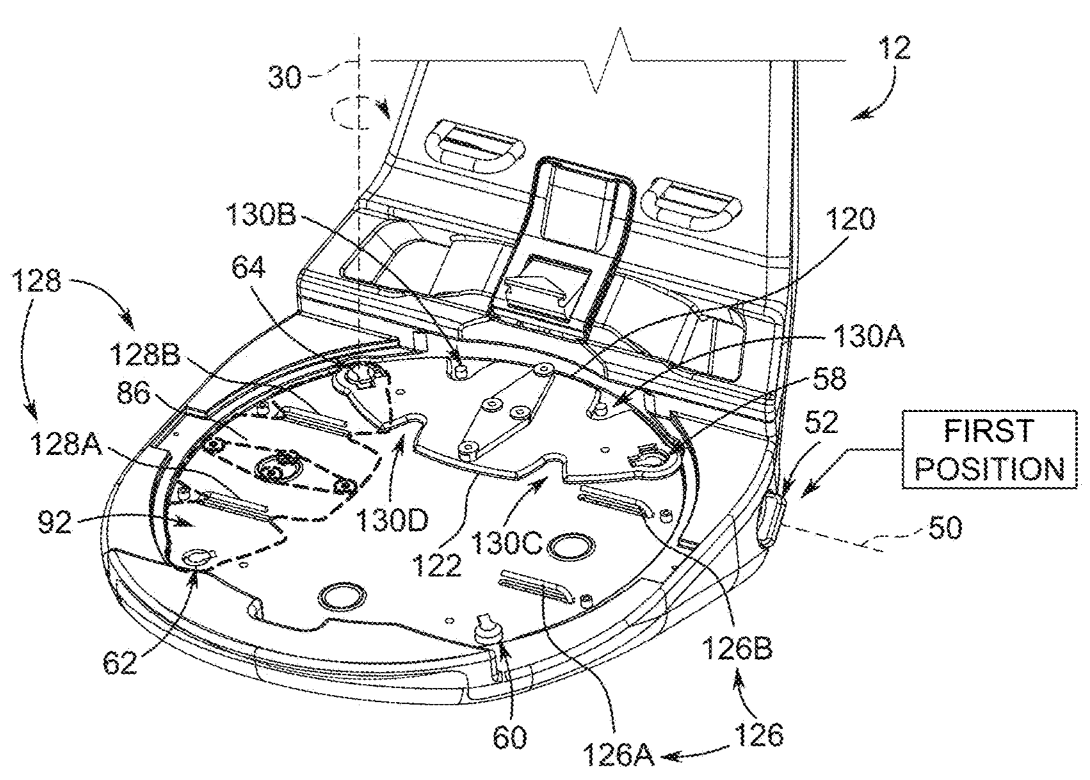
Figure 12:
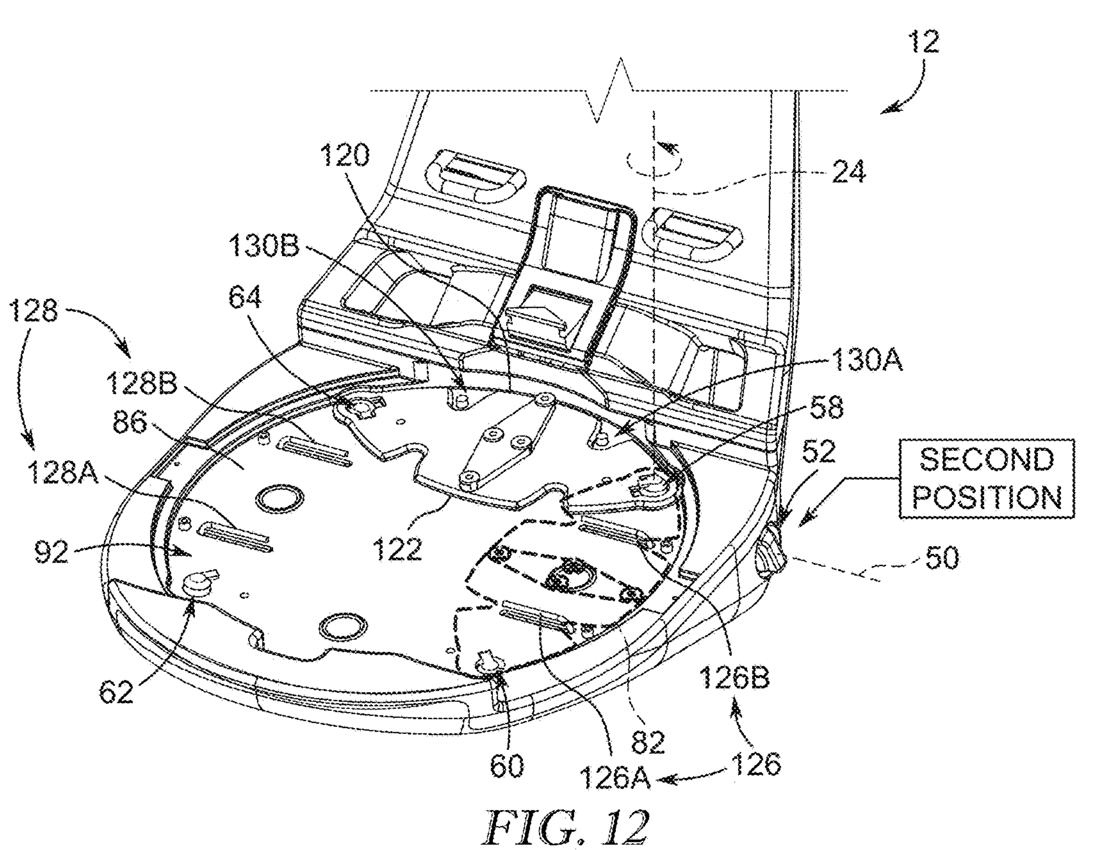
Figure 13:
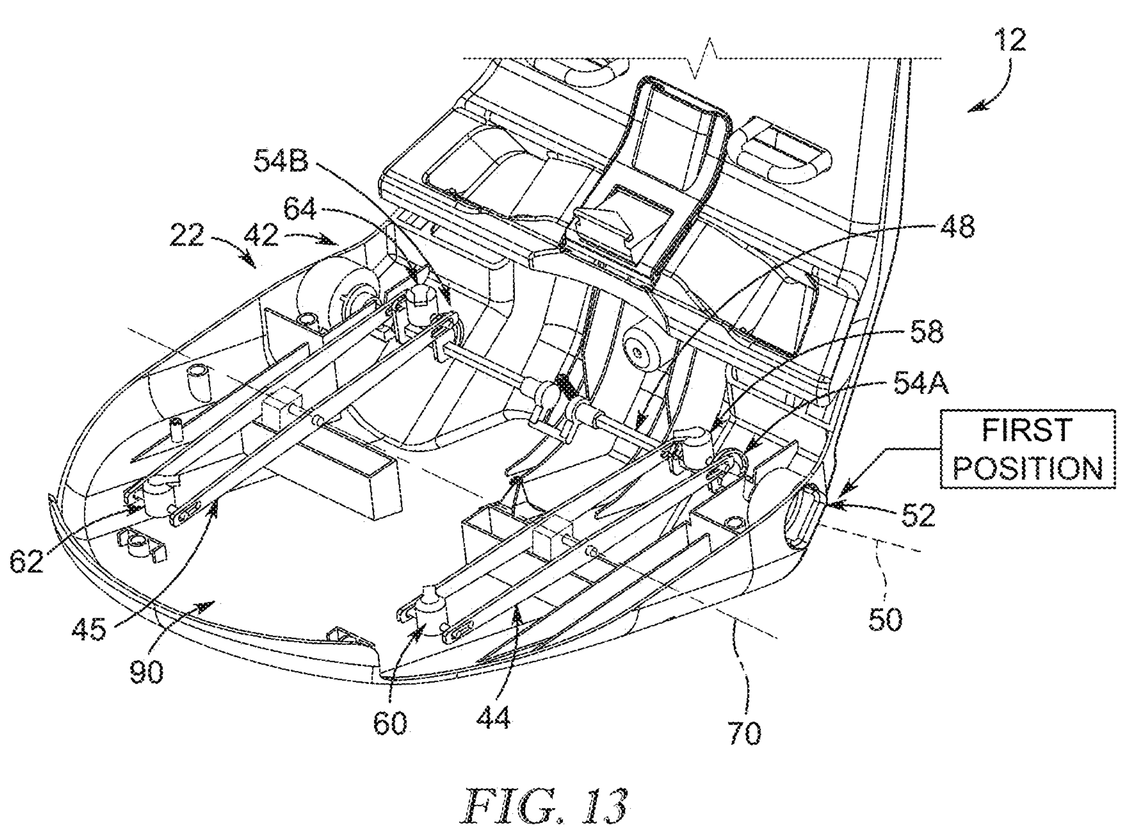
Figure 14:
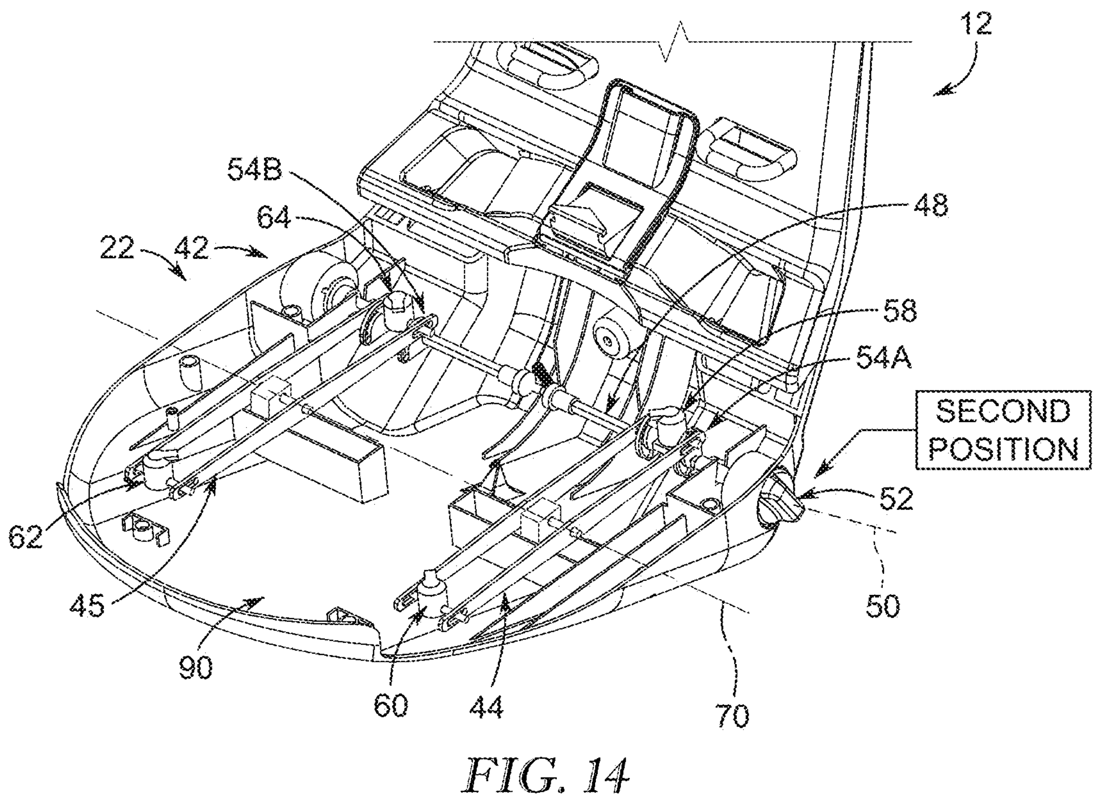
Figure 15:
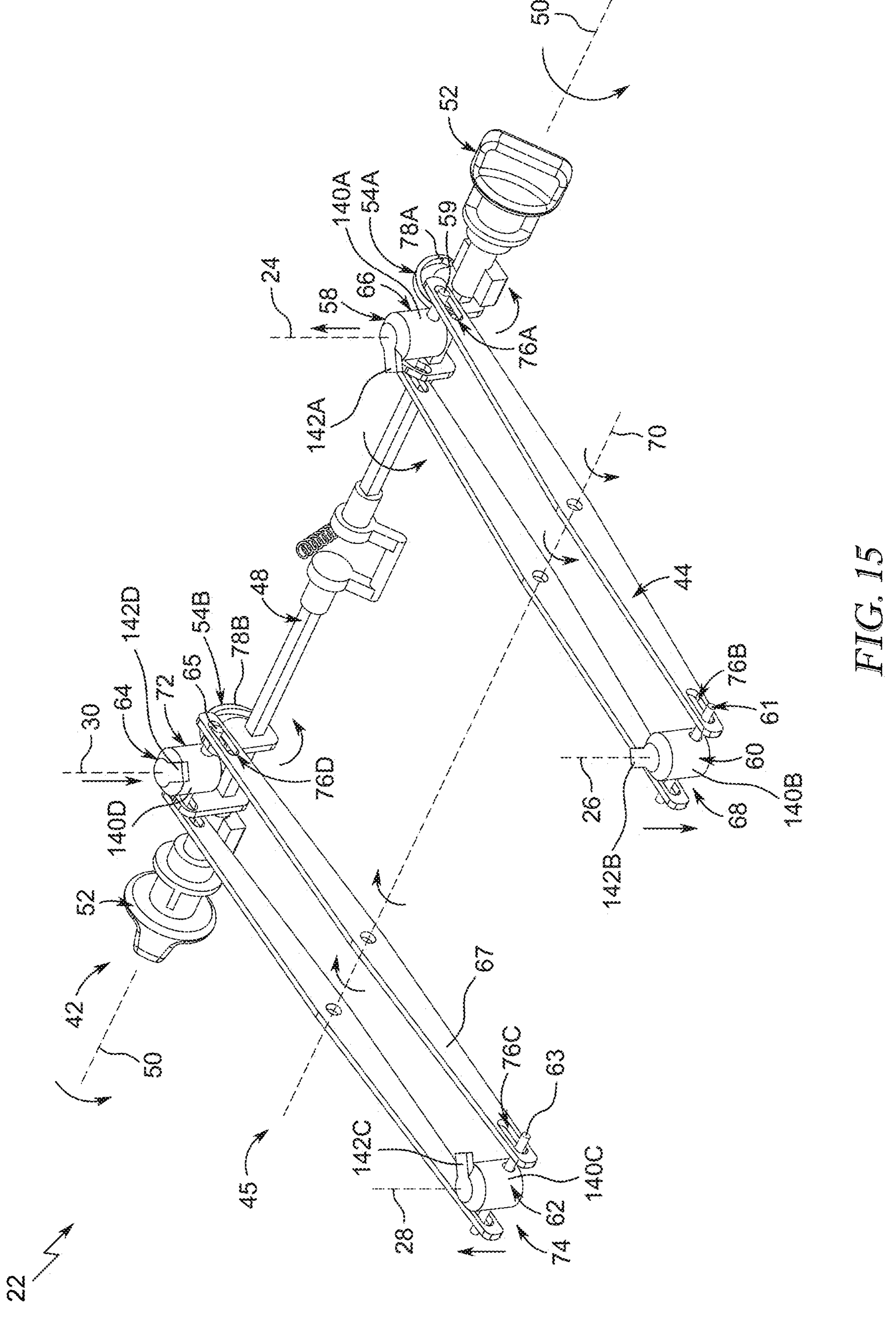
Figure 19:
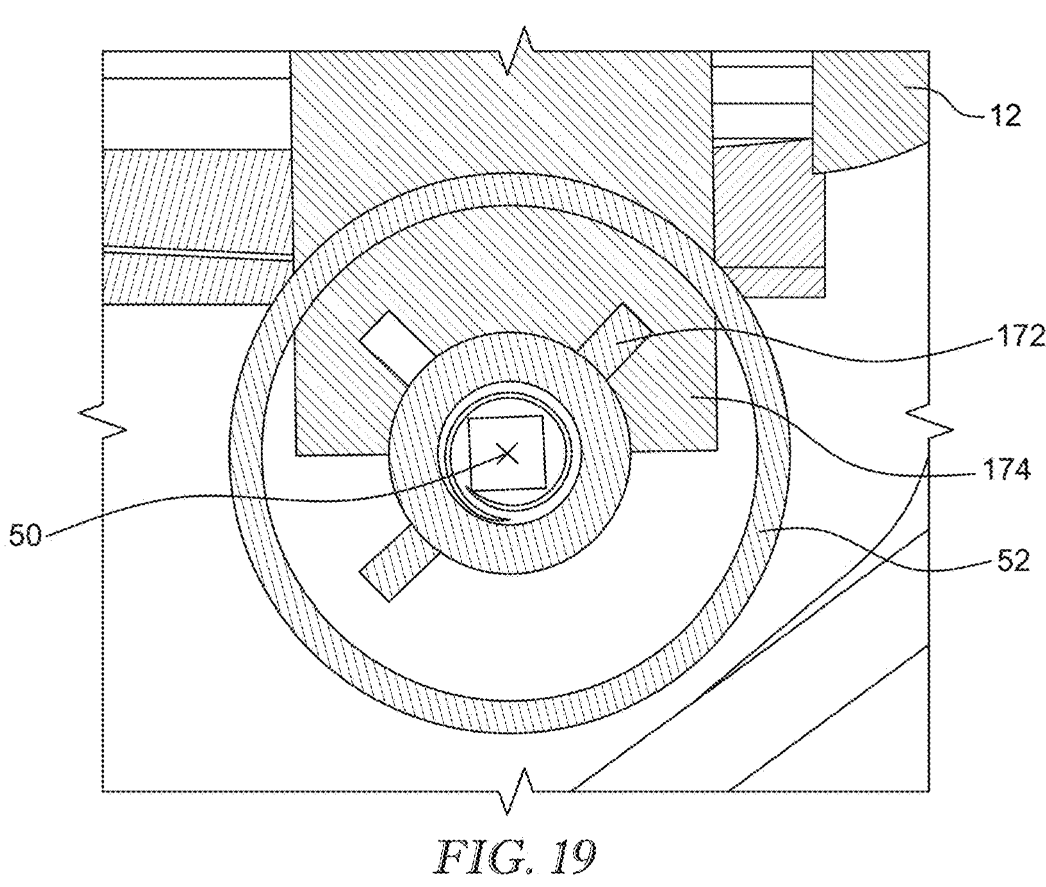
Figure 20:
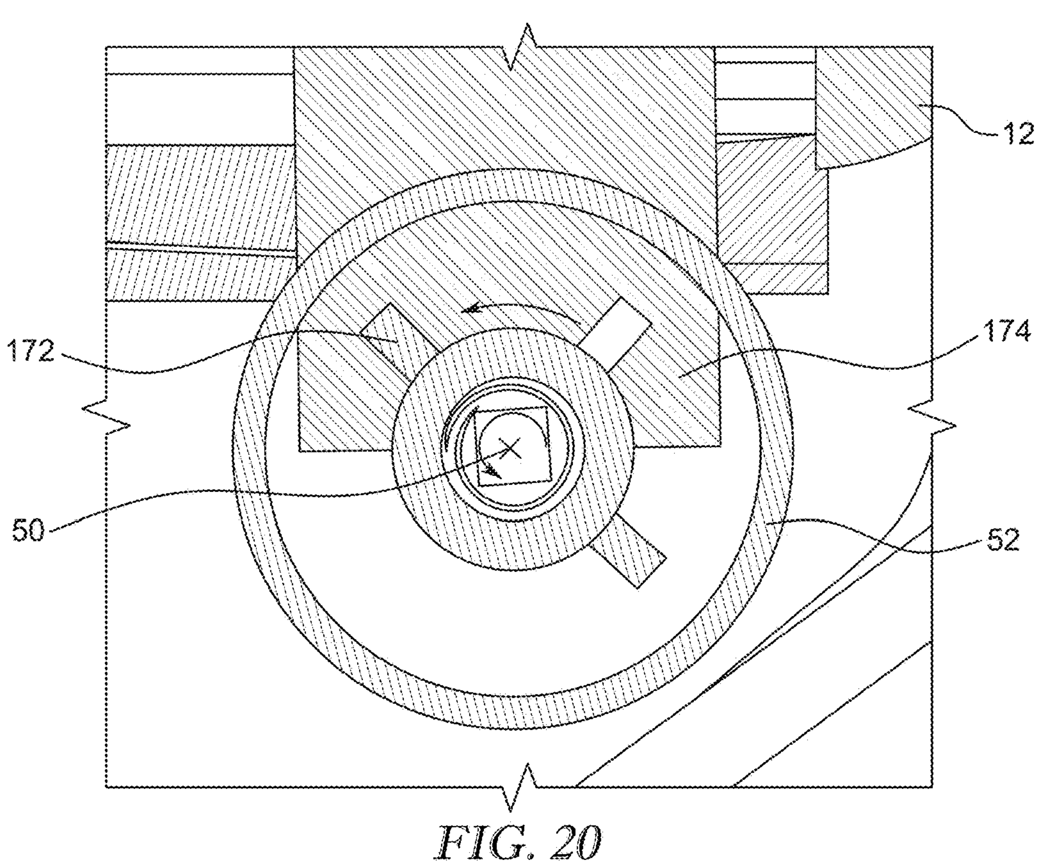
Figure 23:
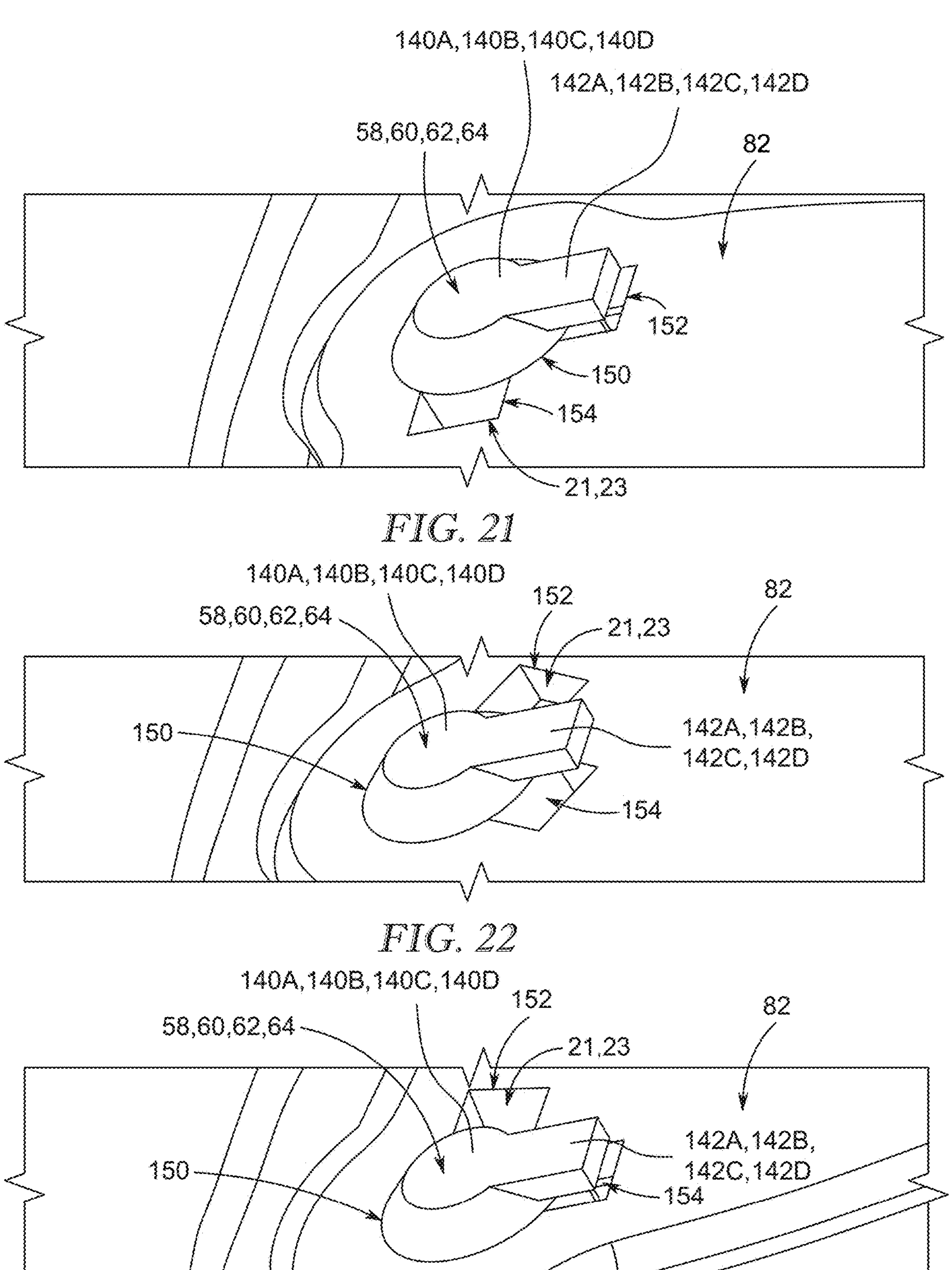
Figure 24:
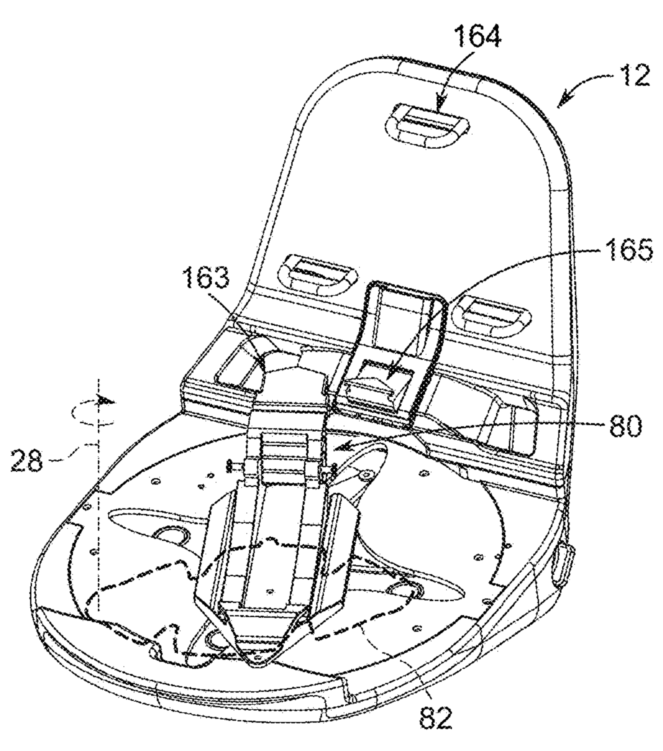
Figure 25:
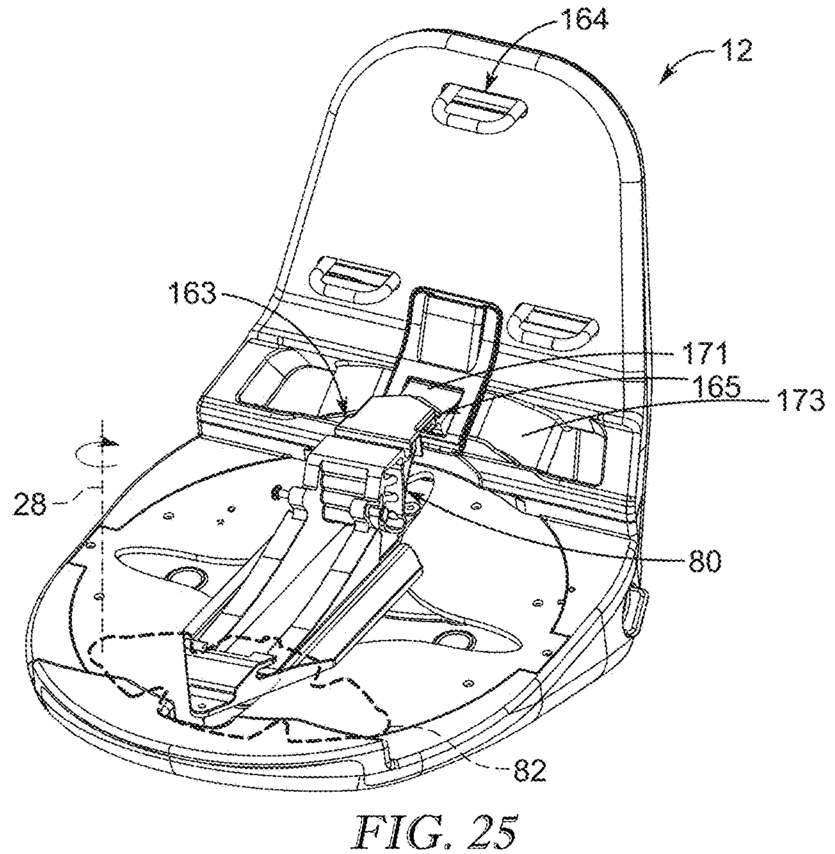
Figure 26:
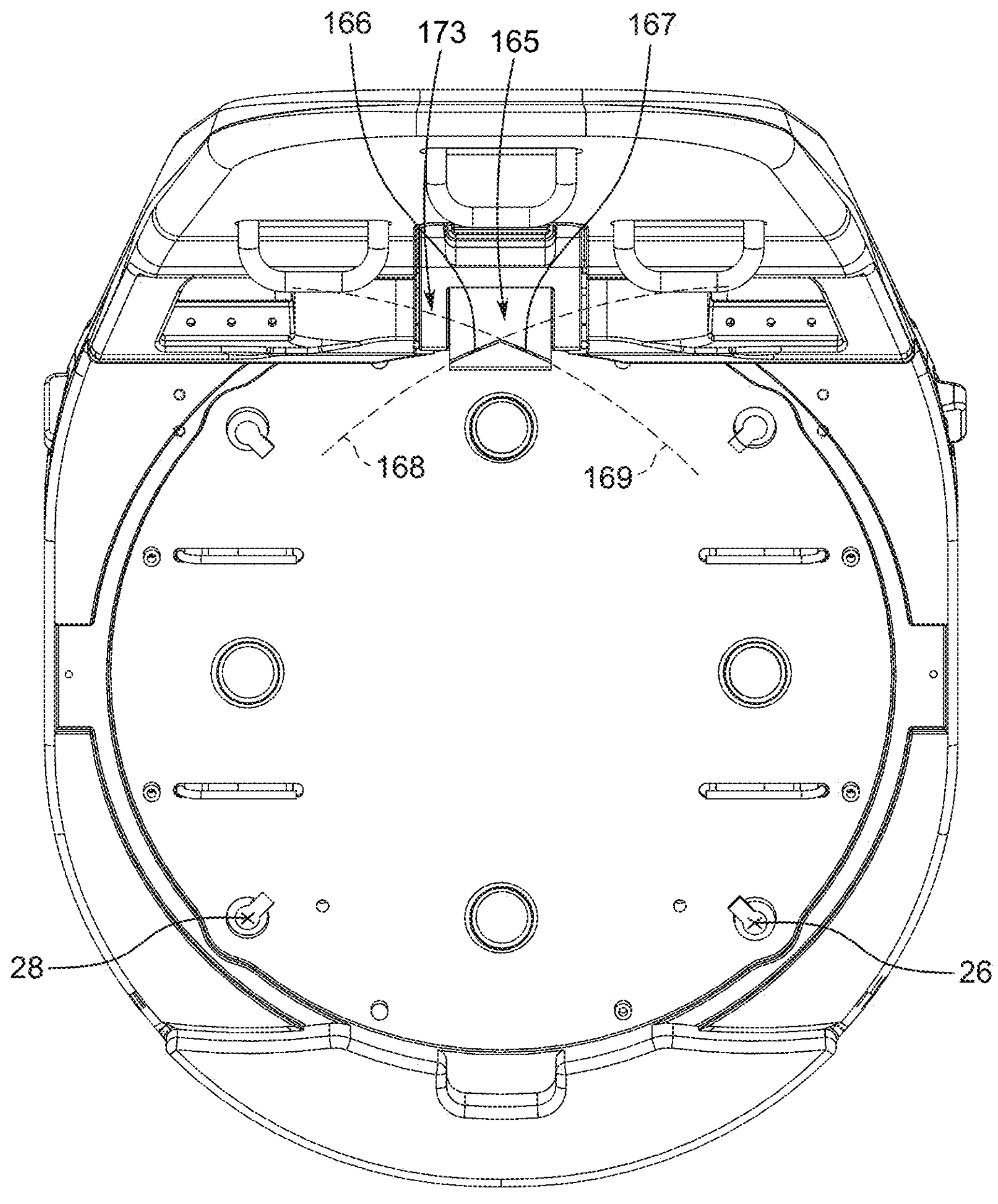
Figure 27:
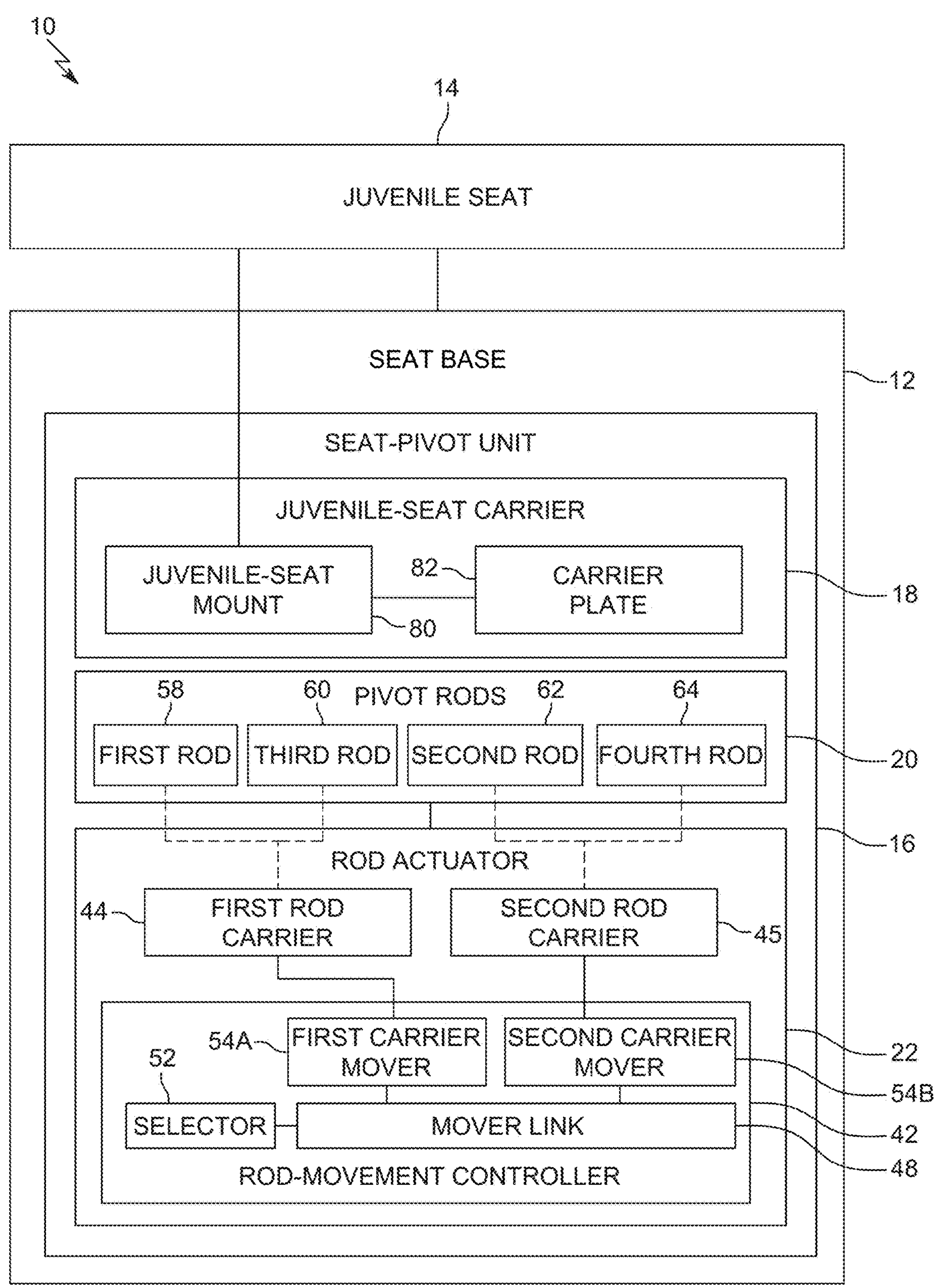
Figure 28:
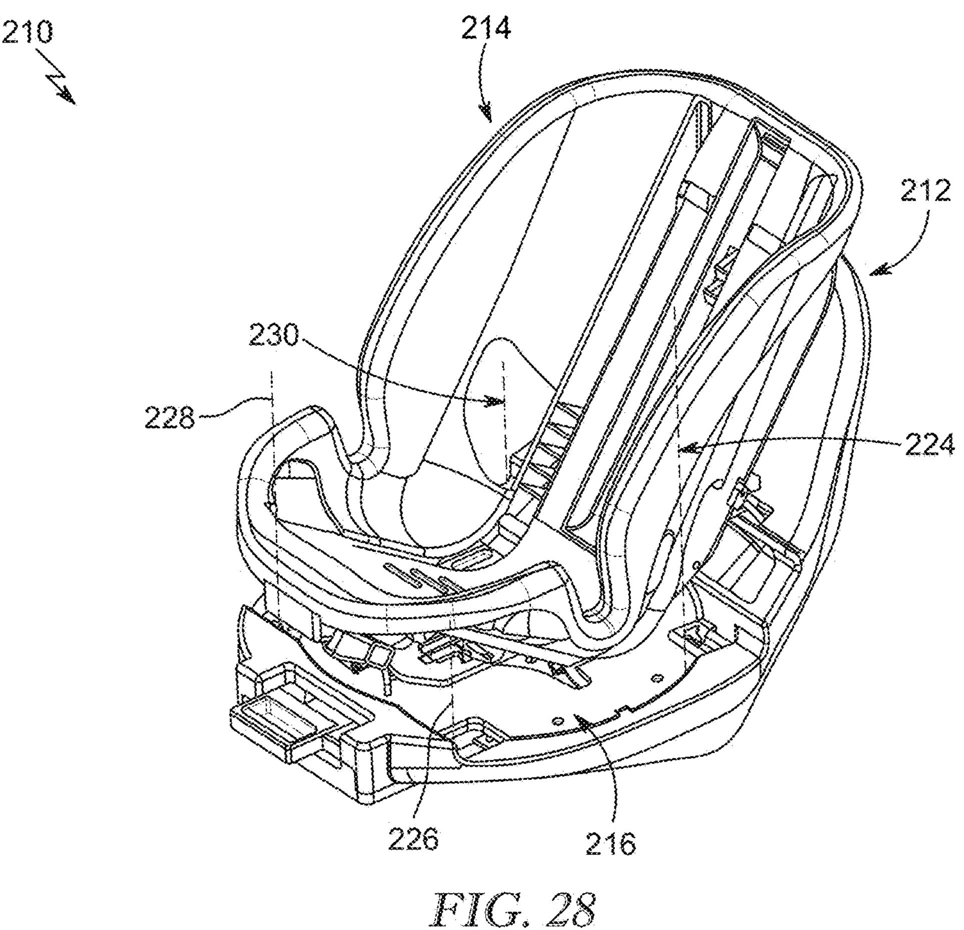
Figure 29:
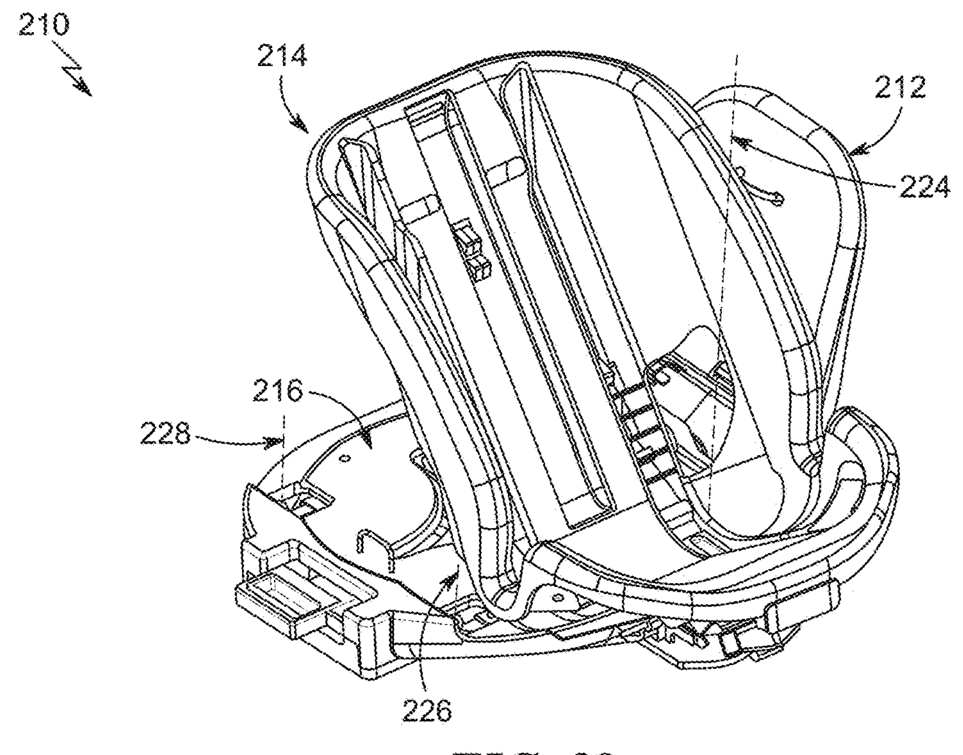
Figure 30:
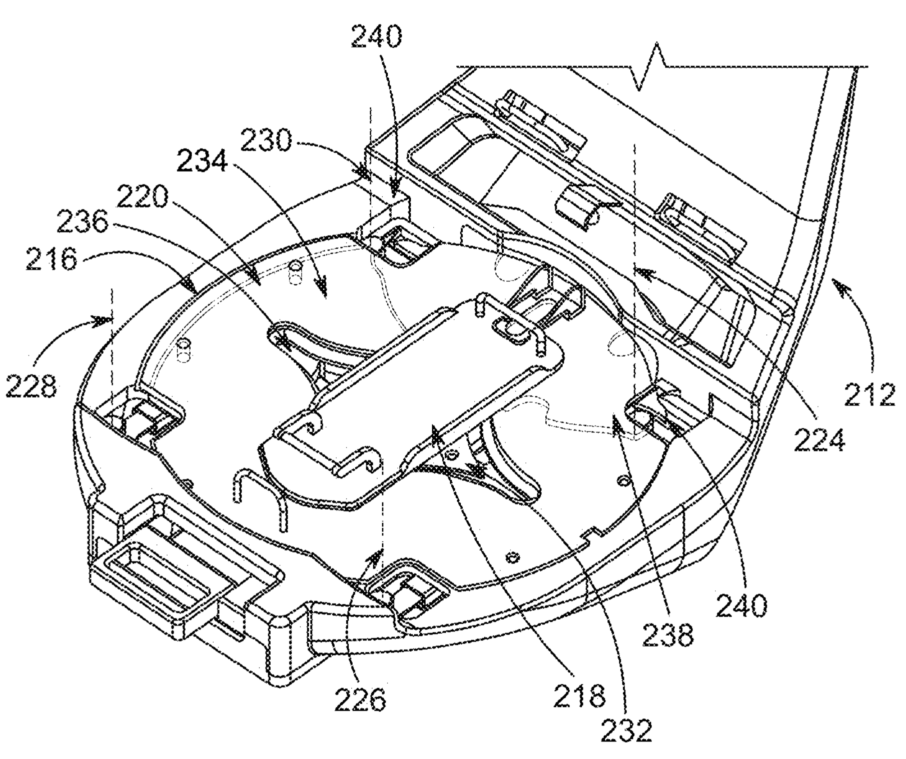
Figure 31:
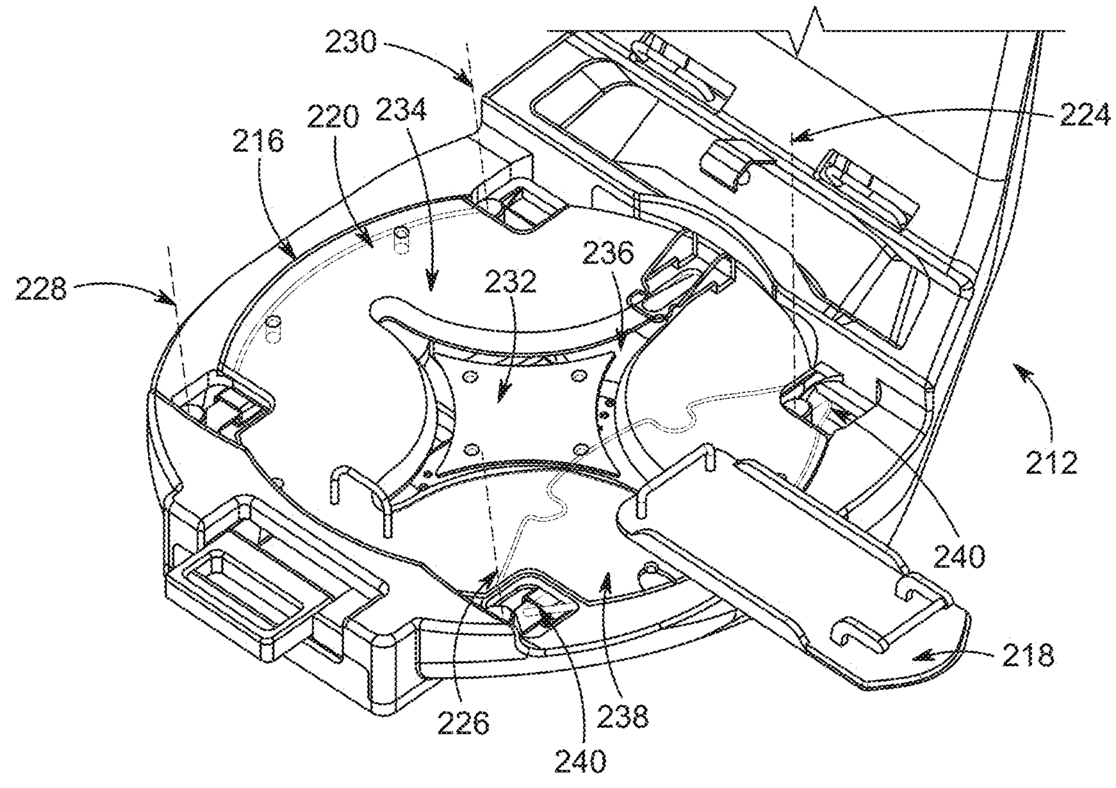
Figure 32:
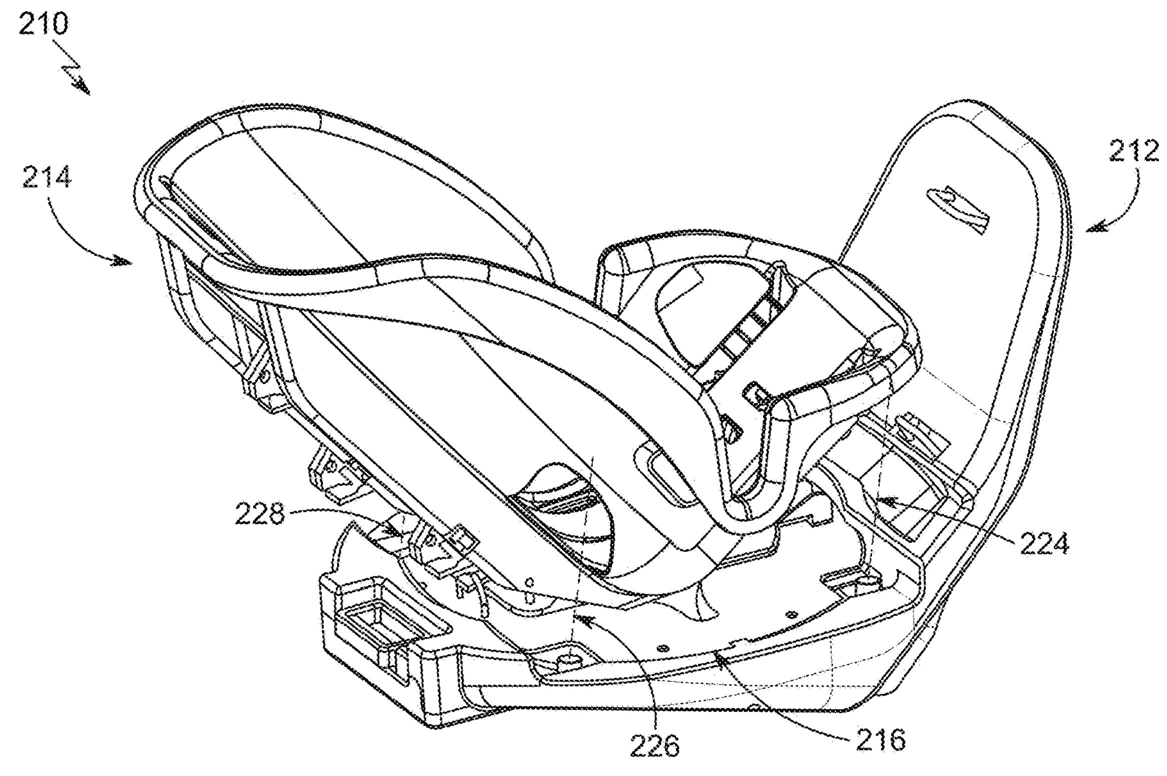
Figure 33:
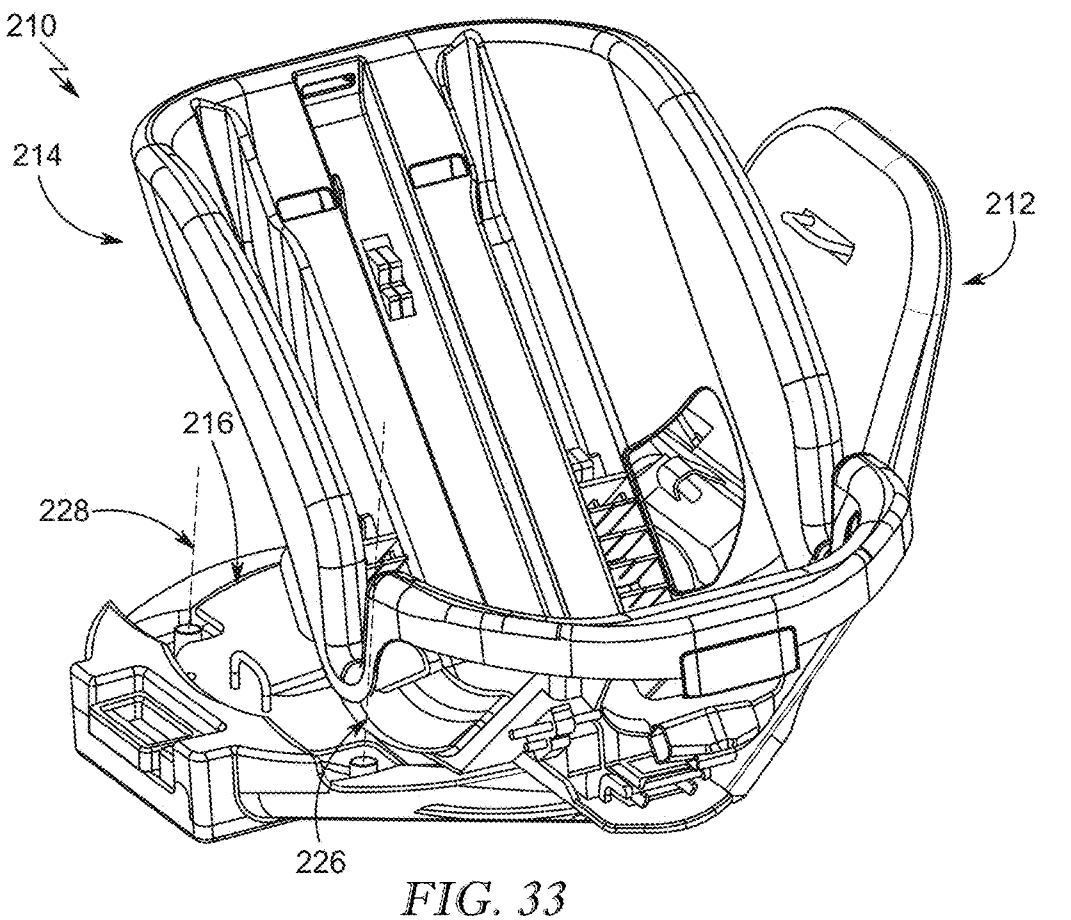
Figure 34:
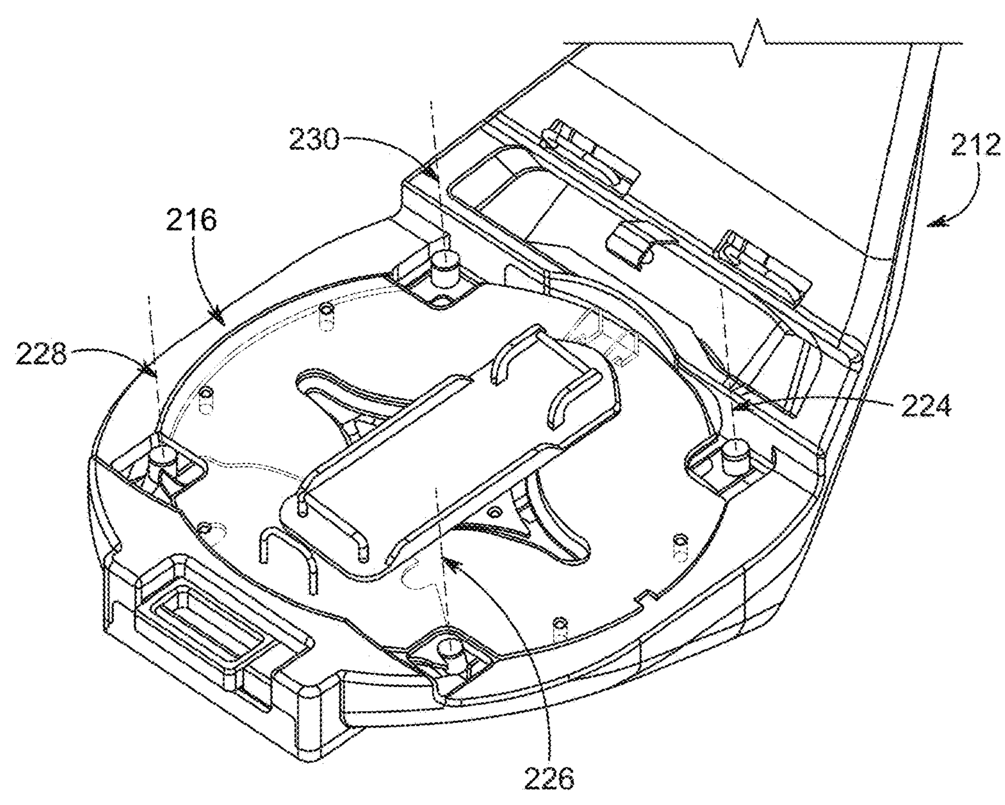
Figure 35:
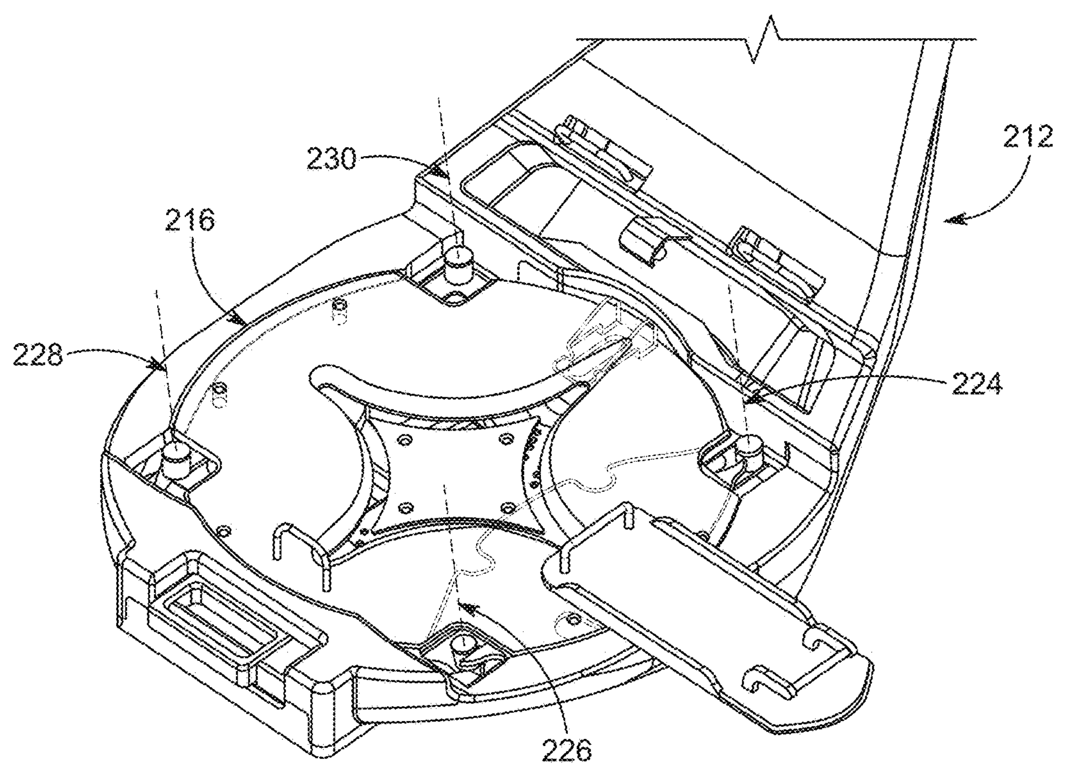
Figure 36:
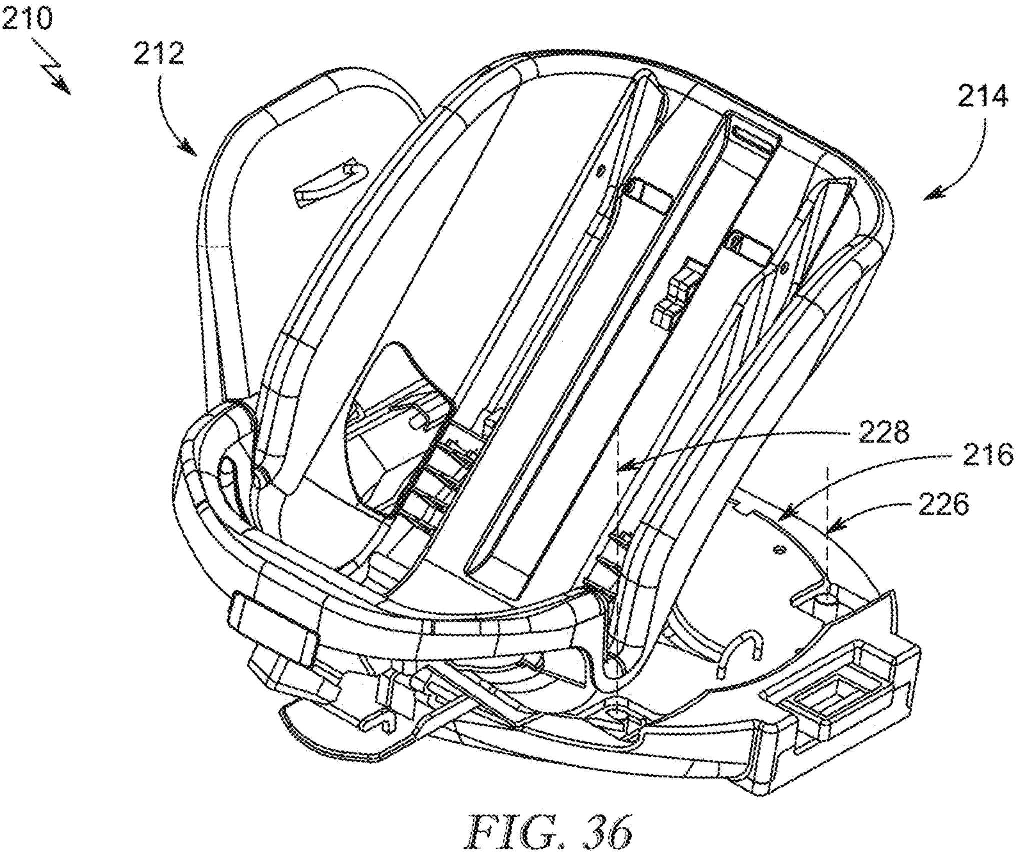
Figure 37:
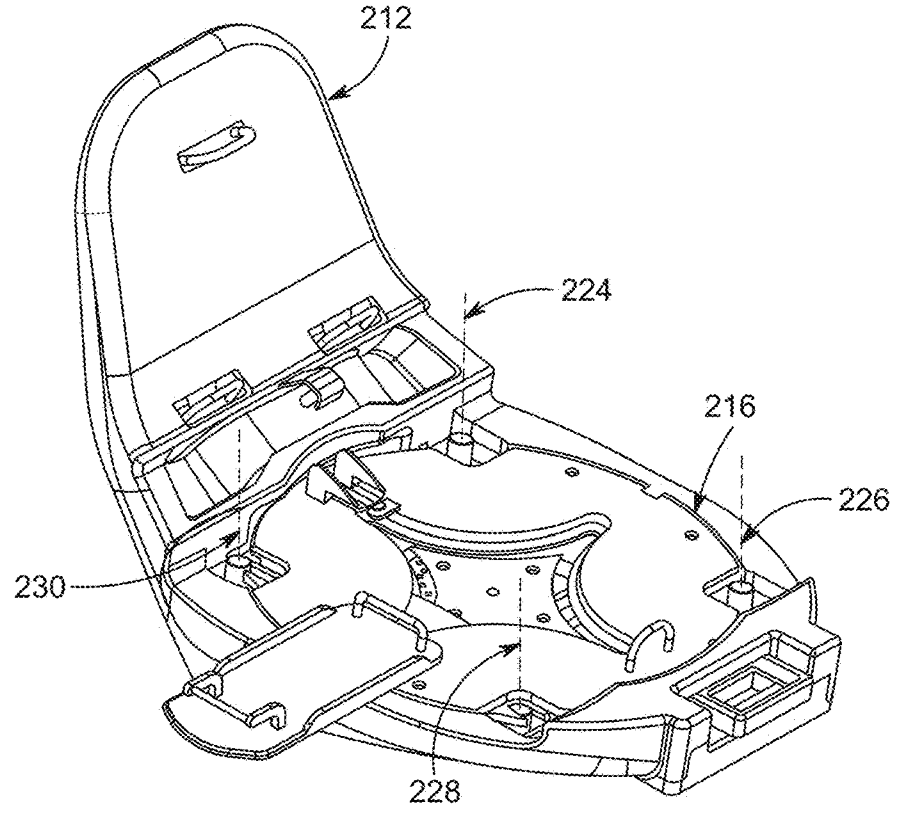
Figure 38:
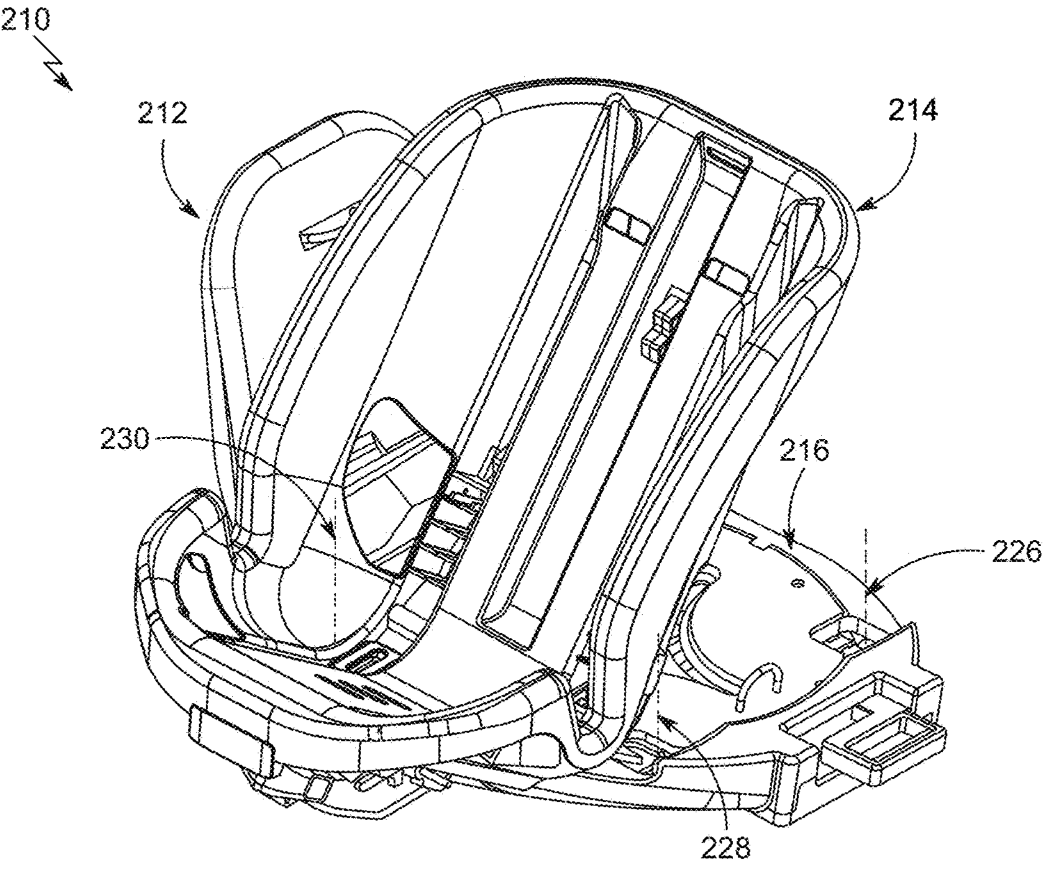
Figure 39:
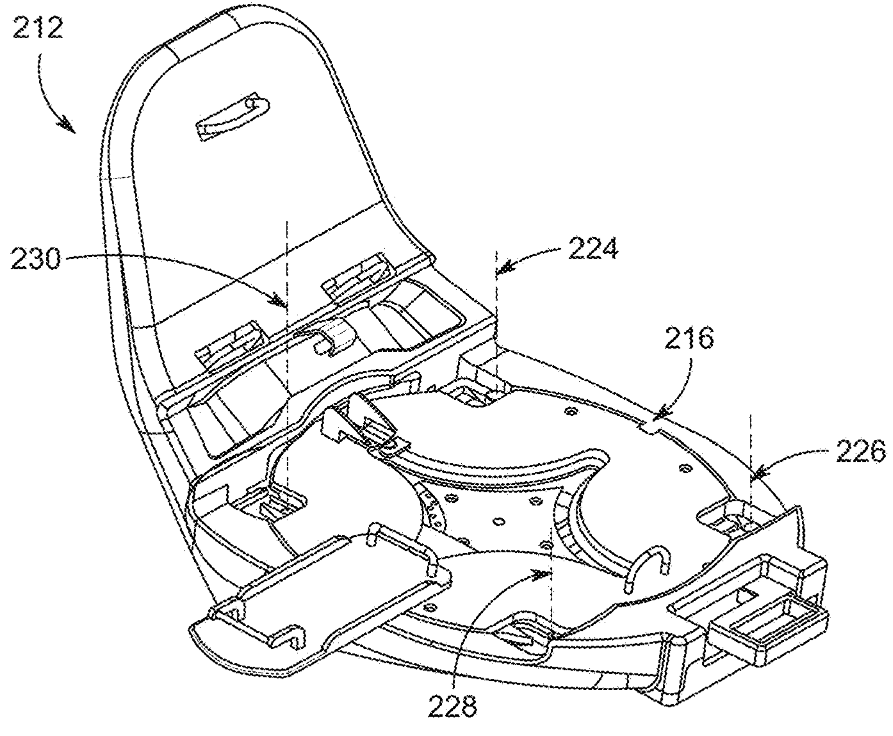
Figure 40:
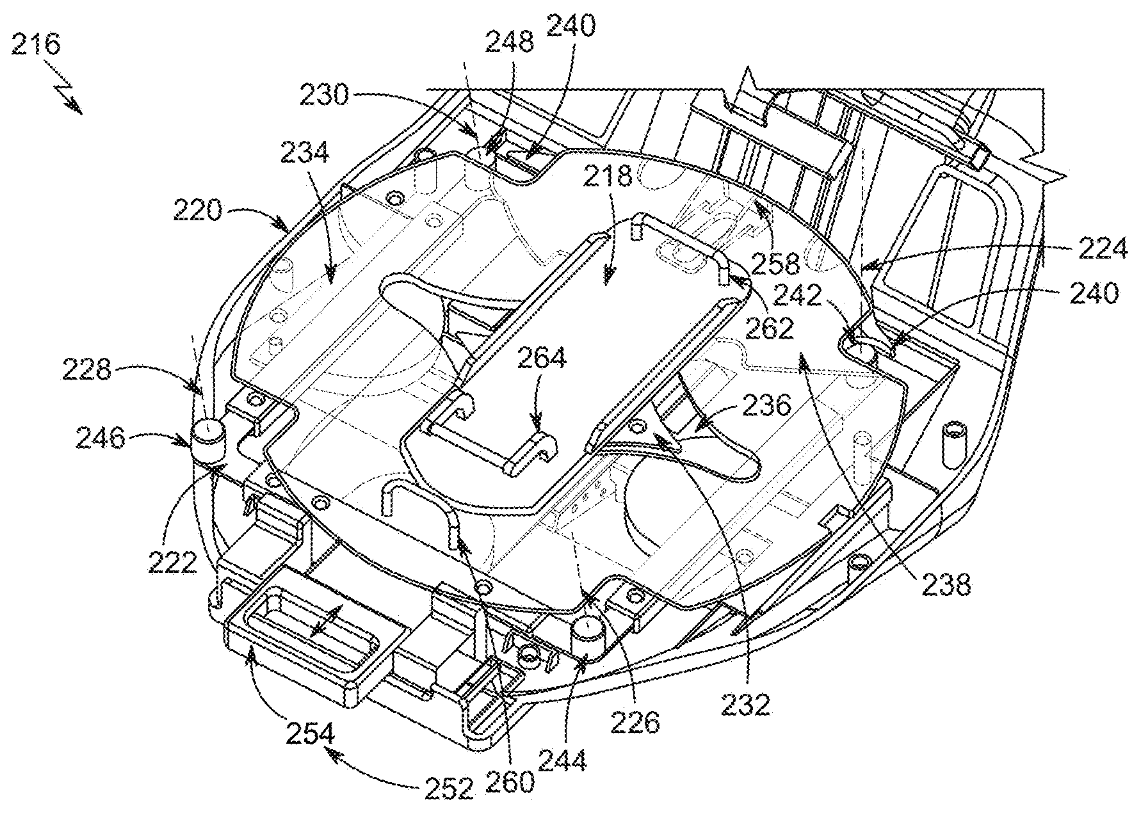
Figure 41:
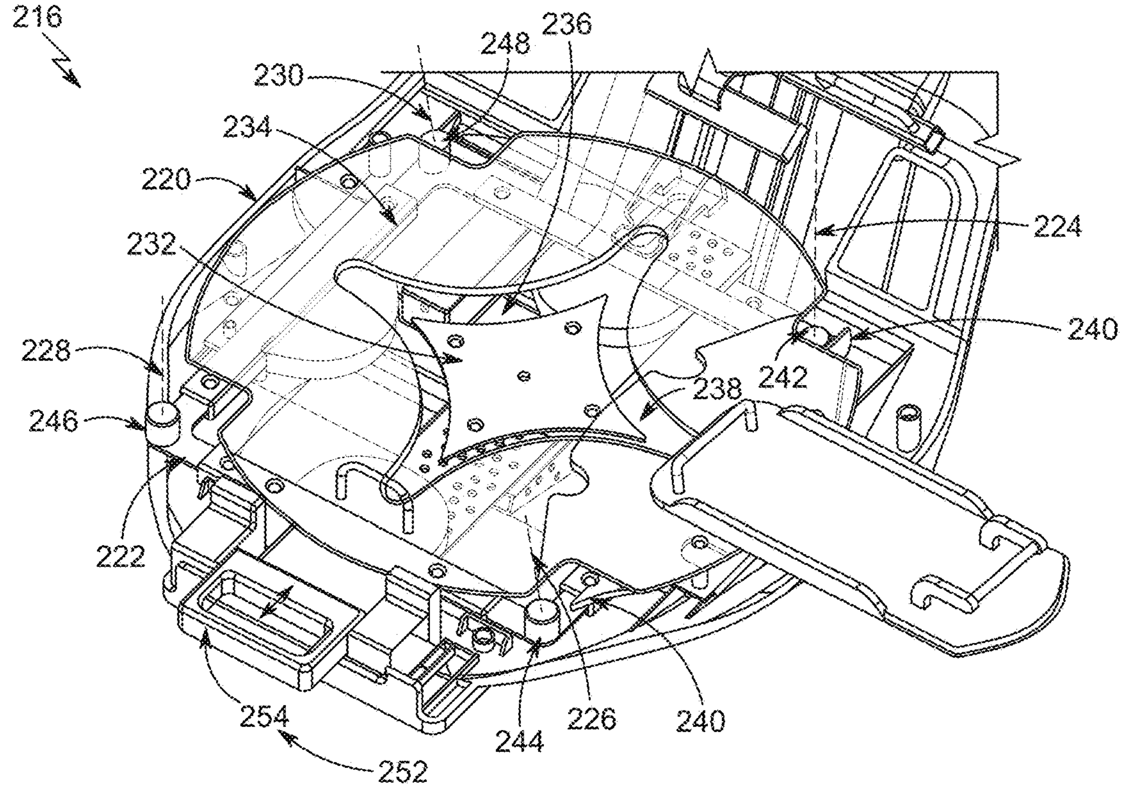
Figure 42:
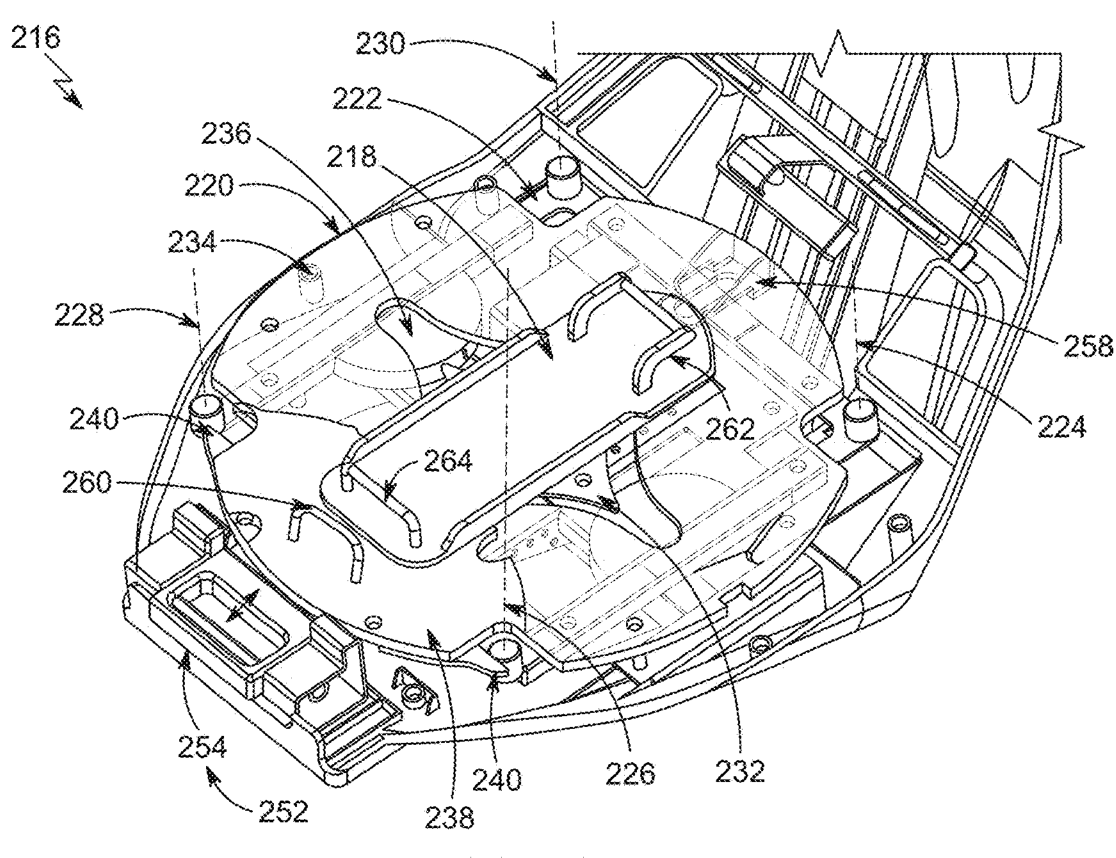
Figure 43:
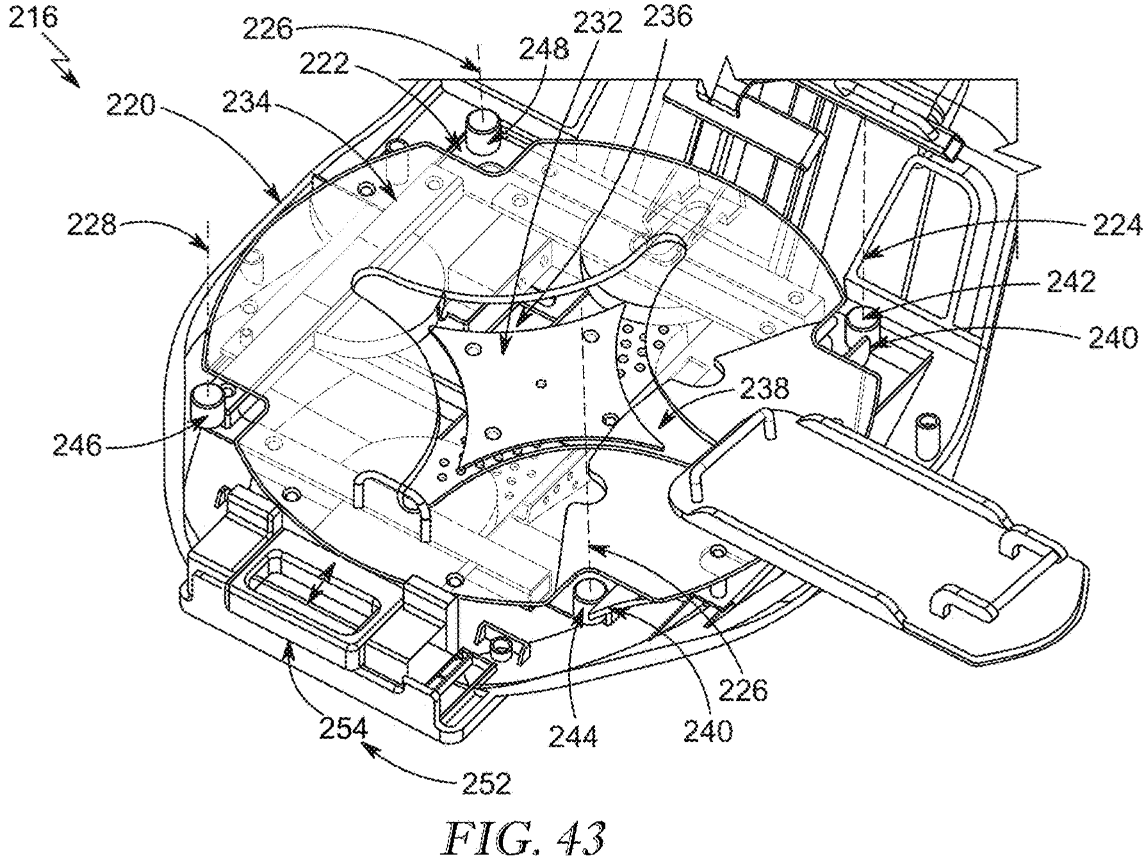
Figure 44:
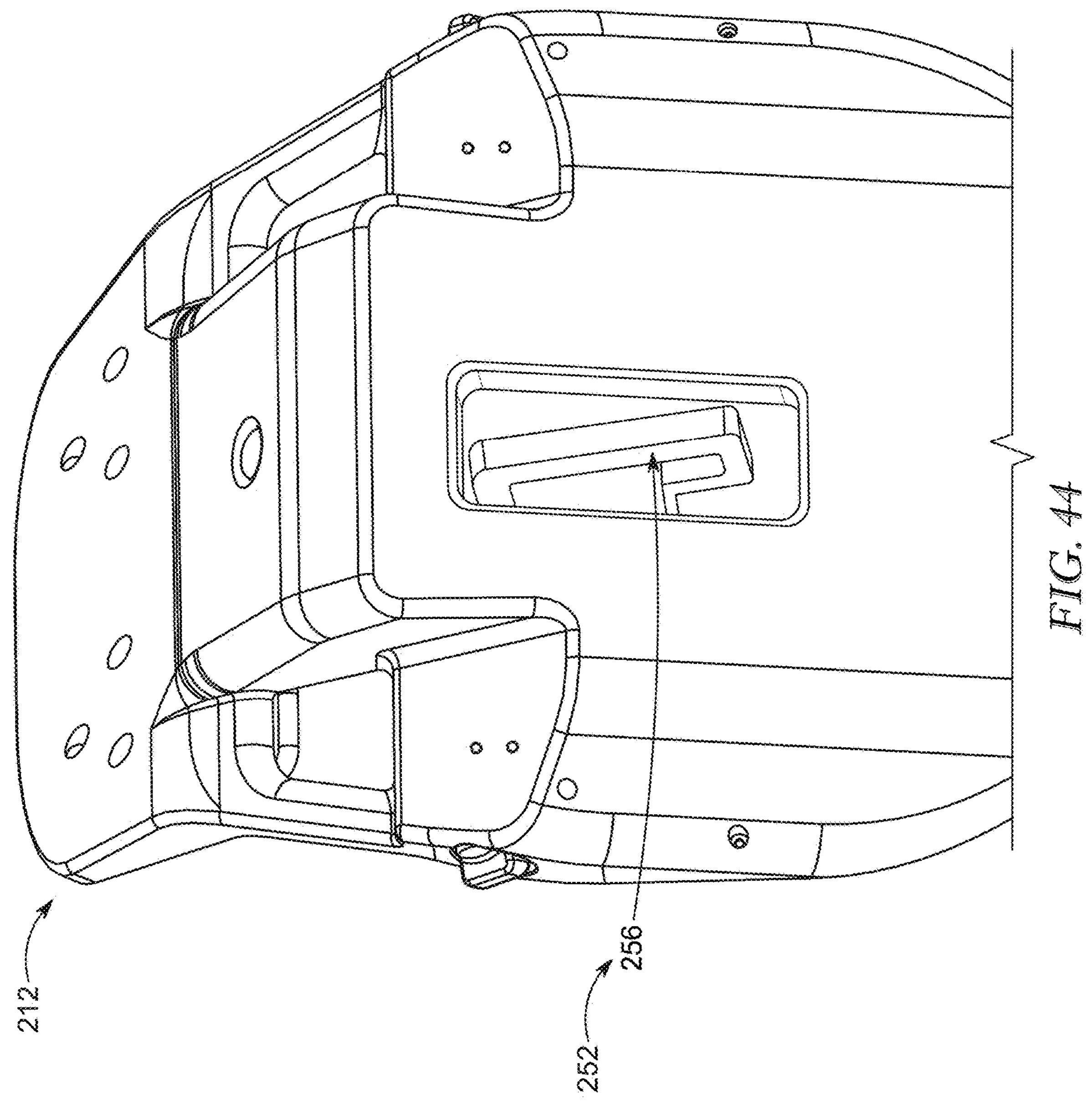

FIG. 3 is a perspective view of the seat base with the juvenile seat and portions of the seat base removed to expose the seat-pivot unit and show that the seat-pivot unit includes a juvenile-seat carrier configured to mount the juvenile seat to the seat base and a plurality of pivot rods configured to engage selectively with the juvenile-seat carrier to establish the selected pivot axis about which the juvenile-seat carrier and the juvenile seat are configured to rotate relative to the seat base;

FIG. 4A is a diagrammatic view of the child restraint installed on a passenger side of a vehicle in a rearward-facing arrangement;

FIG. 4B is a diagrammatic view of the child restraint showing the juvenile seat pivoted about a selected pivot axis included in the multi-axis pivoting means to a pivoted arrangement in which the juvenile seat faces toward the passenger side and is closer to a door of the vehicle on the passenger side so that a caregiver can more easily load and unload the child into and out of the juvenile seat;

FIG. 4C is a diagrammatic view of the child restraint installed on a driver side of the vehicle in the rearward-facing arrangement;

FIG. 4D is a diagrammatic view of the child restraint showing the juvenile seat pivoted about another pivot axis included in the multi-axis pivoting means to another pivoted arrangement in which the juvenile seat faces toward the driver side and is closer to a door of the vehicle on the driver side so that a caregiver can more easily load and unload the child into and out of the juvenile seat;

FIG. 5A is a diagrammatic view of the child restraint installed on the passenger side of a vehicle in a forward-facing arrangement;

FIG. 5B is a diagrammatic view of the child restraint showing the juvenile seat pivoted about another pivot axis included in the multi-axis pivoting means to the same pivoted arrangement shown in FIG. 4B in which the juvenile seat faces toward the passenger side and is closer to a door of the vehicle on the passenger side so that a caregiver can more easily load and unload the child into and out of the juvenile seat;

FIG. 5C is a diagrammatic view of the child restraint installed on the driver side of the vehicle in the forward-facing arrangement;

FIG. 5D is a diagrammatic view of the child restraint showing the juvenile seat pivoted about another pivot axis included in the multi-axis pivoting means to the same pivoted arrangement shown in FIG. 4D in which the juvenile seat faces toward the driver side and is closer to a door of the vehicle on the driver side so that a caregiver can more easily load and unload the child into and out of the juvenile seat;

FIG. 6 is an exploded assembly view of the child restraint showing that the seat base includes a bottom plate and a top plate spaced apart from the bottom plate to provide a first cavity therebetween and formed to include a plurality of openings that correspond to the plurality of pivot rods, and showing that the seat-pivot unit further includes a rod actuator located at least partially in the first cavity and coupled to the plurality of pivot rods to move the plurality of pivot rods relative to the seat base to engage with the juvenile-seat carrier at the selection of a user and establish the selected pivot axis;

FIG. 7 is a perspective and diagrammatic view of the seat base with the juvenile seat removed to show that the one out of up to four pivot axes may be selected by the user using the rod actuator and showing that each of the pivot axes is offset from both a longitudinal centerline of the seat base and a lateral centerline of the seat base;

FIG. 8 is a perspective and diagrammatic view of the seat base in a first pivoted arrangement after pivoting about one of the pivot axes;

FIG. 9 is a perspective view of the seat base with portions removed to show that the juvenile-seat carrier includes a carrier plate configured to engage with only one of the pivot rods to establish the selected pivot axis about which the juvenile seat rotates, and showing a selector of the rod actuator in a first position to engage a first pivot rod with the carrier plate and establish a first pivot axis that allows the juvenile seat to move from the rearward-facing arrangement to the first pivoted arrangement;

FIG. 10 is a perspective view of the seat base with portions removed to show the carrier plate in the rearward-facing arrangement and showing selector in a second position to engage a second pivot rod with the carrier plate and establish a second pivot axis that allows the juvenile seat to move from the rearward-facing arrangement to a second pivoted arrangement facing in an opposite direction from the first pivoted arrangement;

FIG. 11 is a perspective view of the seat base with portions removed to show the carrier plate in the forward-facing arrangement and showing selector in the first position to engage a third pivot rod with the carrier plate and establish a third pivot axis that allows the juvenile seat to move from the forward-facing arrangement to the second pivoted arrangement;

FIG. 12 is a perspective view of the seat base with portions removed to show the carrier plate in the forward-facing arrangement and showing selector in the second position to engage a fourth pivot rod with the carrier plate and establish a fourth pivot axis that allows the juvenile seat to move from the forward-facing arrangement to the first pivoted arrangement;

FIG. 13 is a perspective view of the seat base with the top plate removed to expose the rod actuator and show that the rod actuator includes a pair of rod carriers each coupled to two of the pivot rods and a rod-movement controller coupled to the rod carriers and configured to move between the first and second positions to cause movement of the rod carriers, and showing the rod-movement controller in the first position in which a first set of two pivot rods are pushed in an upward direction toward the carrier plate and a second set of two pivot rods are withdrawn in an opposite, downward direction away from the carrier plate;

FIG. 14 is a perspective view of the seat base with the top plate removed to expose the rod actuator and show the rod-movement controller in the second position in which the first set of two pivot rods are withdrawn in the downward direction away from the carrier plate and the second set of two pivot rods are pushed in the upward direction toward the carrier plate;

FIG. 15 is a perspective view of the rod actuator showing that the rod-movement controller includes the selector, a first carrier mover coupled to the first rod carrier, a second carrier mover coupled to the second rod carrier, and a mover link interconnecting the selector, the first carrier mover, and the second carrier mover, and showing that the rod-movement controller is configured to pivot about a controller axis between the first and second positions to cause simultaneous pivoting motion of the first and second rod carriers about a common axis in opposite directions relative to one another;

FIG. 16 is an exploded assembly view showing the selector removed from the seat base and including a controller lock configured to block movement of rod-movement controller about the controller axis;

FIG. 17 is a perspective view showing the controller lock in a locked position in which a flange included in the controller lock engages a flange stop to block rotation of the rod-movement controller about the controller axis;

FIG. 18 is a perspective view showing the controller lock in an unlocked position in which the selector is pushed inwardly to separate the flange from the flange stop so that the rod-movement controller is free to pivot between the first and second positions;

FIG. 19 is a cross section taken along line 19-19 in FIG. 17 showing the controller lock in the locked position where the flange extends into a first slot included in the flange stop to lock the rod-movement controller in the first position;

FIG. 20 is a cross section similar to FIG. 19 showing the controller lock in the locked position where the flange extends into a second slot included in the flange stop to lock the rod-movement controller in the second position;

FIG. 21 is a perspective view of one of the pivot rods received in an aperture formed in the carrier plate showing that each pivot rod include a rod base and a rod flange extending away from the rod base and showing that the apertures formed in the carrier plate include a circular portion corresponding to the rod base, a first keyed portion configured to align with the rod flange to allow insertion and removal of the pivot rod in one of the arrangements of the juvenile seat, and a second keyed portion configured to align with the rod flange to allow insertion and removal of the pivot rod in another arrangement of the juvenile seat;

FIG. 22 is a perspective view of the pivot rod and carrier plate pivoted about the pivot rod showing both keyed portions of the aperture misaligned with the rod flange to block insertion and removal of the pivot rod from the aperture;

FIG. 23 is a perspective view of the pivot rod and carrier plate showing the carrier plate pivoted to an arrangement where the second keyed portion of the aperture is aligned with the rod flange to allow insertion and removal of the pivot rod from the aperture;

FIG. 24 is a perspective view showing the juvenile-seat carrier slightly pivoted about one of the pivot axes and showing a seat attachment member misaligned with a seat anchor fixed to the seat base;

FIG. 25 is a perspective view showing the juvenile-seat carrier in the rearward-facing arrangement where the seat attachment member interlocks with the eat anchor;

FIG. 26 is a top plan view of the seat base with the juvenile-seat carrier removed to show that the seat anchor includes a first curved segment having a center at one of the pivot axes and a second curved segment having a center at another of the pivot axes;

FIG. 27 is a diagrammatic view of the child restraint;

FIG. 28 is a perspective view of another embodiment of a child restraint including a seat-pivot unit configured to provide multi-axis pivoting means for a juvenile seat relative to a seat base;

FIG. 29 is a perspective view of the child restraint showing the juvenile seat in a first pivoted arrangement relative to the seat base;

FIG. 30 is a perspective view of the child restraint with the juvenile seat removed showing a juvenile-seat carrier in a forward-facing arrangement;

FIG. 31 is a perspective view of the child restraint with the juvenile seat removed showing the juvenile-seat carrier in the first pivoted arrangement;

FIG. 32 is a perspective view of the child restraint showing the juvenile seat in a rearward-facing arrangement;

FIG. 33 is a perspective view of the child restraint showing the juvenile seat in the first pivoted arrangement;

FIG. 34 is a perspective view of the child restraint with the juvenile seat removed showing the juvenile-seat carrier in the rearward-facing arrangement;

FIG. 35 is a perspective view of the child restraint with the juvenile seat removed showing the juvenile-seat carrier in the first pivoted arrangement;

FIG. 36 is a perspective view of the child restraint showing the juvenile seat in a second pivoted arrangement;

FIG. 37 is a perspective view of the child restraint with the juvenile seat removed showing the juvenile-seat carrier in the second pivoted arrangement;

FIG. 38 is a perspective view of the child restraint showing the juvenile seat in the second pivoted arrangement after pivoting to the second pivoted arrangement from the forward-facing arrangement;

FIG. 39 is a perspective view of the child restraint with the juvenile seat removed showing the juvenile-seat carrier in the second pivoted arrangement;

FIG. 40 is a perspective view of the seat base with portions shown with transparency to show the juvenile-seat carrier in the forward-facing arrangement and showing the seat-pivot unit including a frame carrying four pivot rods that can be moved with the frame to selectively engage with the juvenile-seat carrier and establish a selected pivot axis about which the juvenile seat rotates;

FIG. 41 is a perspective view of the seat base with portions shown with transparency and showing the juvenile-seat carrier in the first pivoted arrangement;

FIG. 42 is a perspective view of the seat base with portions shown with transparency to show the juvenile-seat carrier in the rearward-facing arrangement;

FIG. 43 is a perspective view of the seat base with portions shown with transparency and showing the juvenile-seat carrier in the first pivoted arrangement; and FIG. 44 is a perspective view of a bottom of the seat base showing that the seat-pivot unit includes a rear handle that can be actuated to control movement of the frame.

DETAILED DESCRIPTION

A child restraint 10 includes a seat base 12 and a juvenile seat 14 coupled to the seat base 12 and adapted to hold and secure a child 11 for transportation in a vehicle 100 as shown in FIGS. 1-3. The juvenile seat 14 is pivotable relative to the seat base 12 to move the juvenile seat 14 and the child 11 seated in the juvenile seat 14 from a position inside a cabin 102 of the vehicle 100 to a position that is closer to or at least partially outside of a door 104 of the vehicle 100 as suggested by FIGS. 4A-5D. When the juvenile seat 14 is closer to or partially outside of the vehicle door 104, a caregiver can more easily place or remove the child 11 into and out of the juvenile seat 14. A second embodiment of a child restraint 210 is shown in FIGS. 28-44.

The juvenile seat 14 is pivotable relative to at least a portion of the seat base 12 by multi-axis pivoting means provided by a seat-pivot unit 16 included in the child restraint 10 as shown in FIGS. 1-5D. The multi-axis seat-pivot unit 16 allows the juvenile seat 14 to pivot about multiple axes between four arrangements depending on the size of the child seated on the juvenile seat 14 and the side of the vehicle 100 that the child restraint 10 is installed. The seat-pivot unit 16 allows the juvenile seat 14 to move between a rearward-facing arrangement in which the child 11 faces the rear 108 of the vehicle 100 for relatively smaller children as shown in FIGS. 4A and 4C, and a forward-facing arrangement in which the child 11 faces the front 106 of the vehicle 100 for relatively larger children as shown in FIGS. 5A and 5C. The seat-pivot unit 16 also allows the juvenile seat 14 to move to a first pivoted arrangement in which the child 11 faces laterally toward the driver side 110 of the vehicle 100 as shown in FIGS. 4D and 5D, and a second pivoted arrangement in which the child 11 faces laterally toward the passenger side 112 of the vehicle 100 as shown in FIGS. 4B and 5B. One out of up to four total pivot axes 24, 26, 28, 30 can be selected and established by reconfiguring the seat-pivot unit 16 so that the juvenile seat 14 is able to pivot from either the forward-facing arrangement or the rearward-facing arrangement to either the first or second pivoted arrangement.

The seat-pivot unit 16 includes a juvenile-seat carrier 18 configured to couple with the juvenile seat 14 for movement therewith, a plurality of pivot rods 20 configured to engage the juvenile-seat carrier 18 to establish the pivot axis 24, 26, 28, 30 about which the juvenile seat 14 rotates, and a rod actuator 22 configured to engage the move each of the pivot rods 20 relative to the seat base 12 to establish one out of the four possible pivot axes 24, 26, 28, 30 about which the juvenile seat 14 pivots as shown in FIGS. 1-12. The juvenile-seat carrier 18 moves with the juvenile seat 14 and may include one or more attachment members 19 (e.g. hooks, rods, and/or posts, for example) that allow the juvenile seat 14 to be separated from the seat base 12 and the juvenile-seat carrier 18. The plurality of pivot rods 20 extend and retract to engage and disengage from the juvenile-seat carrier 18 depending on the position of the rod actuator 22. A caregiver can selectively adjust the rod actuator 22 to move the pivot rods 20 and establish a selected pivot axis 24, 26, 28, 30 to cause the juvenile seat 14 to pivot to the first or second pivoted arrangement about the selected pivot axis 24, 26, 28, 30 depending on where the caregiver has installed the child restraint 10 (i.e. on the passenger side or the driver side) and if the juvenile seat 14 is in the rearward-facing arrangement or the forward-facing arrangement.

The rod actuator 22 includes an rod-movement controller 42, a first rod carrier 44 coupled to the rod-movement controller 42, and a second rod carrier 45 coupled to the rod-movement controller 42 and spaced apart from the first rod carrier 44 as shown in FIGS. 6-15. The rod-movement controller 42 is configured to change the pivot axis about which the juvenile seat 14 rotates. The rod carriers 44, 45 are coupled to the rod-movement controller 42 and to the plurality of pivot rods 20 to cause movement of the plurality of rods relative to the seat base 12 in response to movement of the rod-movement controller 42. In some embodiments, only one rod carrier may be included in the child restraint 10.

The rod-movement controller 42 is configured to change the selected pivot axis based on the location of the child restraint 10 in the vehicle. For example, the rearward-facing arrangement may be used for a smaller or younger child, while the forward-facing arrangement is may be used for a larger or older child. If it is desired to change the juvenile seat 14 from the rearward-facing arrangement to the forward-facing arrangement, the rod-movement controller 42 can be used to do so. For example, when the juvenile seat 14 is in the rearward-facing arrangement on passenger side 112, as shown diagrammatically in FIGS. 4A-4B, and pivot axis 28 is engaged, the juvenile seat 14 can move from the rearward-facing arrangement to the first pivoted arrangement. Likewise, when the juvenile seat 14 is in the rearward-facing arrangement on driver side 110, as shown diagrammatically in FIGS. 4C-4D, and pivot axis 26 is engaged, the juvenile seat 14 can move from the rearward-facing arrangement to the second pivoted arrangement.

In the forward-facing arrangement, the rod-movement controller 42 can be adjusted to engage pivot axis 28 or 30 instead of pivot axis 24 or 26 so that the juvenile seat 14 can move from the forward-facing arrangement to the first or second pivoted arrangements, as shown diagrammatically in FIGS. 5A-5D. This adjustment may be used, for example, when the caregiver moves the child restraint 10 from the driver side 110 to the passenger side 112 of the vehicle 100.

As shown diagrammatically in FIGS. 4A-5D, the plurality of pivot rods 20 are synchronized to engage with the juvenile-seat carrier 18 and establish only one axis 24, 26, 28, 30 at a time depending on the arrangement of the juvenile seat 14. For example, when the juvenile seat 14 is in the first pivoted arrangement, for example, and pivot axis 26 is engaged, pin-movement controller 42 can be moved to establish axis 24 so that the juvenile seat 14 can be changed from the first pivoted arrangement to the forward-facing arrangement. Likewise, when the juvenile seat 14 is in the second pivoted arrangement, for example, and pivot axis 28 is engaged, pin-movement controller 42 can be moved to establish axis 24 so that the juvenile seat 14 can be changed from the second pivoted arrangement to the forward-facing arrangement.

In the illustrative embodiment, each of the pivot axes 24, 26, 28, 30 are offset from a longitudinal centerline 13 of the seat base 12 extending in a front-to-rear direction through a center of the seat base 12 as shown in FIGS. 7 and 8. In the illustrative embodiment, each of the pivot axes 24, 26, 28, 30 are also offset from a lateral centerline 15 of the seat base 12 extending in a side-to-side direction through the center of the seat base 12 and perpendicularly to the longitudinal centerline 13. Pivot axes 24, 26 are separated from pivot axes 28, 30 by the longitudinal centerline 13. Pivot axes 24 and 30 are separated from pivot axes 26, 28 by the lateral centerline 15.

The rod-movement controller 42 includes a mover link 48 pivotable about a controller axis 50 between a first position and a second position, a selector 52 coupled to the mover link 48, and a pair of carrier movers 54A, 54B coupled to the mover link 48 and the rod carriers 44, 45. The selector 52 is configured to be gripped and moved the caregiver to rotate the mover link 48 about the controller axis 50. The carrier movers 54A, 54B are configured to drive the rod carriers 44, 45 to raise and lower the plurality of pivot rods 20. Accordingly, if a caregiver wishes to change the pivot axis about which the juvenile seat 14 rotates, the caregiver would use the selector 52 (i.e. rotate the selector 52) to cause the mover link 48 and carrier mover 54 to rotate and move the rod carriers 44, 45 so that the pivot rods 20 raise or lower.

The plurality of rods 20 includes a first pivot rod 58, a second pivot rod 60 spaced longitudinally from the first pivot rod 58, a third pivot rod spaced laterally from the second pivot rod and longitudinally from the first pivot rod 58, and a fourth pivot rod 64 spaced longitudinally from the third pivot rod 62 and laterally from the first pivot rod 58. Only one of these four rods 58, 60, 62, 64 is engaged with the juvenile-seat carrier 18 at a time to define the pivot axis about which the juvenile seat 14 rotates.

The juvenile-seat carrier 18 includes a seat mount 80 and a carrier plate 82 coupled to the seat base 12 for movement therewith and relative thereto. The seat mount 80 is configured to engage selectively with the juvenile seat 14 to mount the juvenile seat 14 to the seat base 12. The carrier plate 82 is configured to engage selectively with one of the pivot rods 58, 60, 62, 64 to establish the axis 24, 26, 28, 30 about which the juvenile seat 14 and the juvenile-seat carrier 18 pivot.

The seat base 12 includes a bottom wall 84, a top wall 86 spaced apart from the bottom wall 84, and a guide plate 88 as shown in FIG. 6. A first cavity 90 is defined between the bottom wall 84 and the top wall 86. A second cavity 92 is defined between the top wall 86 and the guide plate 88 and is separated from the first cavity 90 by the top wall 86. The rod actuator 22 is received in the first cavity 90 and the carrier plate 82 is received in the second cavity 92.

The top wall 86 is formed to include a first opening 71 corresponding to the first pivot rod 58, a second opening 73 corresponding to the second pivot rod 60, a third opening 75 corresponding to the third pivot rod 62, and a fourth opening 77 corresponding to the fourth pivot rod 64. Each of the pivot rods 58, 60, 62, 64 is configured to extend into the second cavity 92 when engaged with the carrier plate 82 and retract into the first cavity 90 when disengaged from the carrier plate 82.

The rod carriers 44, 45 are movable between a first position in which one of the first rod 58 and the third rod 62 is engaged with the carrier plate 82 and a second position in which one of the second rod 60 and the fourth rod 64 is engaged with the carrier plate 82. The first and third pivot rods 58, 62 extend through the first and third openings 71, 75 into the second cavity 92 when the rod-movement controller 42 is in the first position and retract out of the second cavity 92 and into the first cavity 90 when the rod-movement controller 42 is in the second position. The second and fourth pivot rods 60, 64 extend through the second and fourth openings 73, 77 into the second cavity 92 when the rod-movement controller 42 is in the second position and retract out of the second cavity 92 and into the first cavity 90 when the rod-movement controller 42 is in the first position.

The first rod carrier 44 extends between a first end 66 coupled to the carrier mover 54 and a second end 68. The first rod carrier 44 is rotatable about a carrier axis 70 upon movement of the carrier mover 54 to move the second end 68 upward or downward relative to the carrier axis 70. Similarly, the second rod carrier 45 extends between a first end 72 coupled to the carrier mover 54 and a second end 74. The second rod carrier 45 is rotatable about the carrier axis 70 upon movement of the carrier mover 54 to move the second end 74 upward or downward relative to the carrier axis 70.

The four rods 58, 60, 62, 64 are coupled to the first rod carrier 44 or the second rod carrier 45 for movement therewith. The first rod 58 is coupled to the first end 66 of the first rod carrier 44 and the second rod 60 is coupled to the second end 68 of the first rod carrier 44. The third rod 62 is coupled to the second end 74 of the second rod carrier 45 and the fourth rod 64 is coupled to the first end 72 of the second rod carrier 45. The first rod 58 defines pivot axis 24, the second rod 60 defines pivot axis 26, the third rod 62 defines pivot axis 28, and the fourth rod 64 defines pivot axis 30.

In the illustrative embodiment, the first rod carrier 44 and the second rod carrier 45 are formed to define a pair of slots 76 at each end 66, 68, 72, 74 to receive a respective pin 59, 61, 63, 65. The pins 59, 61, 63, 65 travel through the slots 76 as the rod carriers 44, 45 pivot about axis 70 so that the rods 58, 60, 62, 64 move only in upward and downward directions.

A first carrier mover 54A is coupled with the first rod carrier 44 and a second carrier mover 54B is coupled with the second rod carrier 45. The second carrier mover 54B is offset from the first carrier mover 54A about the mover link 48 by about 90 degrees to cause different movements between the rod carriers 44, 45 when the selector knob 52 is rotated. Each carrier mover 54A, 54B is formed to include a pair of slots 78 to receive a respective rod carrier 44, 45. Accordingly, upon rotation of the mover link 48, both carrier movers 54A, 54B to drive the rod carriers 44, 45 to pivot in opposite directions about the carrier axis 70 relative to one another. In some embodiments, the carrier axis 70 may not be common between the rod carriers 44, 45 and each rod carrier 44, 45 may pivot about a separate axis.

In illustrative embodiments, the seat-pivot unit 16 includes the carrier plate 82 the plurality of pivot rods 20, and the rod actuator 22. The carrier plate 82 is configured to guide movement of the juvenile seat 14 relative to the seat base 12 between the forward-facing arrangement, the rearward-facing arrangement, the first pivoted arrangement, and the second pivoted arrangement. The rod actuator 22 is configured to move each of the pivot rods 58, 60, 62, 64 relative to the seat base 12 to cause a single pivot rod included in the plurality of pivot rods 20 to engage with the carrier plate 82 to establish a pivot axis included in the plurality of pivot axes about which the juvenile seat 14 is configured to rotate relative to the seat base 12.

The rod-movement controller 42 coupled to the first and second rod carriers 44, 45 and is movable relative to the seat base between a first position, in which one of the first pivot rod and the third pivot rod engages the carrier plate, and a second position, in which one of the second pivot rod and the fourth pivot rod engages the carrier plate. The selector 52 may be a knob configured to be gripped and moved by a user to move the rod-movement controller. A knob may be included on each lateral side of the seat base 12 for access from each lateral side. The mover link 48 may be a rod or axle interconnecting both carrier movers 54A, 54B and each knob.

In the illustrative embodiment, the carrier movers 54A, 54B each include a cam that engages a portion of each respective rod carrier 44, 45 to cause movement thereof when the pin-movement controller 42 is rotated about the controller axis 50 as shown in FIG. 15. In the illustrative embodiment, the cams are defined by slots 78 formed in each carrier mover 54A, 54B. The first carrier mover 54A includes a first cam plate formed to include a first eccentric slot 78A relative to the controller axis 50. A first mover pin 59 is received in the first eccentric slot 78A and a corresponding slot 76A formed in the first rod carrier 44. The second carrier mover 54B includes a second cam plate formed to include a second eccentric slot 78B relative to the controller axis 50. A second mover pin 65 is received in the second eccentric slot 78B and a corresponding slot 76D formed in the second rod carrier 45.

The first eccentric slot 78A is configured to pivot the first rod carrier 44 about the common axis 70 in a first direction in response to rotation of the rod-movement controller 42 from the first position to the second position. The second eccentric slot 78B is configured to pivot the second rod carrier 45 about the common axis 70 in a second direction, opposite the first direction, in response to rotation of the rod-movement controller 42 from the first position to the second position.

The first eccentric slot 78A has a first center offset from the controller axis 50. The second eccentric slot 78B has a second center offset from the controller axis 50 and offset circumferentially from the first center about the controller axis 50. The first and second eccentric slots 78A, 78B have a common radius of curvature.

The rod-movement controller 42 further includes a controller lock 170 configured to block rotation of the rod-movement controller 42 about the controller axis 50. The controller lock 170 is integrated into portions of the selector 52 and the seat base 12. The controller lock 170 includes a flange 172 coupled to the selector 52, a flange stop 174 coupled to the seat base 12, and a biasing spring 176. The flange 172 is normally biased into engagement with the flange stop 174 by the biasing spring to assume a locked position. The selector 52 is configured to translate relative to the seat base 12 along the controller axis 50 to separate the flange 172 from the flange stop 174 as shown in FIGS. 17-20. With the flange 172 separated from the flange stop 174, the rod-movement controller 42 is free to rotate about the controller axis 50 between the first and second positions. Once the selector 52 is released, the biasing spring 176 urges the flange 172 back into engagement with the flange stop 174 and movement of the rod-movement controller 42 is blocked. Illustratively, the flange stop 174 includes a pair of slots configured to receive the flange 172 in the first position or the second position, respectively.

The carrier plate 82 includes a base plate 94 received in the second cavity 92 and guide post 96 coupled to an upper end of the base plate 94. The guide plate 88 is formed to include a guide aperture 89. The guide post 96 is received in the guide aperture 89 and is configured to translate along surfaces of the guide plate 88 defining the guide aperture 89 as the juvenile seat 14 pivots relative to the seat base 12.

The guide aperture 89 includes a front slot 89F, a first lateral slot 891, a second lateral slot 892, and a rear slot 89R. The front slot 89F is configured to receive the guide post 96 when the juvenile seat 14 is in the rearward-facing arrangement. The first lateral slot 891 is configured to receive the guide post 96 when the juvenile seat 14 is in the first pivoted arrangement. The second lateral slot 892 is positioned opposite the first lateral slot 891 and is configured to receive the guide post 96 when the juvenile seat 14 is in the second pivoted arrangement. The rear slot 89R is positioned opposite the front slot 89F and is configured to receive the guide post 96 when the juvenile seat 14 is in a forward-facing arrangement.

The guide post 96 has a diamond shape. The diamond shape corresponds with a shape of the slots 89F, 891, 892, 89R so that the guide post 96 is received therein in each arrangement.

The base plate 86 has a width and a length greater than the width. The base plate 86 has a first curved edge 120 and a second curved edge 122 opposite the first curved edge 124. The first curved edge 120 has a radius of curvature with a center at a center of the guide plate 88 when the juvenile seat 14 is in the rearward-facing arrangement and the forward-facing arrangement. The second curved edge 122 has a radius of curvature with a center at the center of the guide plate 88 when the juvenile seat 14 is in the first pivoted arrangement and the second pivoted arrangement.

In some embodiments, the seat base 12 further includes a first support unit 126 configured to engage the carrier plate in the first pivoted arrangement and a second support unit 128 configured to engage the carrier plate in the second pivoted arrangement The first support unit 126 includes first and second support brackets 126A, 126B that block pivoting of the carrier plate 82 relative to the seat base 12 away from the top plate 86 in the first pivoted arrangement. The second support unit 128 includes third and fourth support brackets 128A, 128B that block pivoting of the carrier plate 82 relative to the seat base 12 away from the top plate 86 in the second pivoted arrangement.

The carrier plate 82 is formed to include a first notch 130A and a second notch 130B on the first edge 120 of the carrier plate 82 and a third notch 130C and a fourth notch 130D on the second edge 122 of the carrier plate 82. The first and second support brackets 126A, 126B are received in the first and second notches 130A, 130B in the first pivoted arrangement. The third and fourth support brackets 128A, 128B are received in the third and fourth notches 130C, 130D in the second pivoted arrangement.

Each of the pivot rods 20 includes a rod base 140A, 140B, 140C, 140D establishing each respective pivot axis and a rod flange 142A, 142B, 142C, 142D coupled to an upper end of each respective rod base 140A, 140B, 140C, 140D and extending away from the rod base 140A, 140B, 140C, 140D perpendicularly to each respective pivot axis. The rod flange 142A of the first pivot rod 58 extends toward the rod flange 140C of the third pivot rod 62. The rod flange 140B of the second pivot rod 60 extends toward the rod flange 140D of the fourth pivot rod 64. The rod flange 140C of the third pivot rod 62 extends toward the rod flange 140A of the first pivot rod 58. The rod flange 140D of the fourth pivot rod 64 extends toward the rod flange 140B of the second pivot rod 60.

The carrier plate 82 is formed to include a first aperture 21 and a second aperture 23 as shown in FIGS. 6-14. Each aperture 21, 23 aligns with a respective rod 58, 60, 62, 64 in each arrangement of the juvenile seat 14. Only one of the rods 58, 60, 62, 64 extends through one of the apertures 21, 23 in each arrangement to establish the pivot axis about which the juvenile seat 14 and the juvenile-seat carrier 18 rotate, upon movement of the rod carrier 44 by the rod-movement controller 42 to the first position or the second position. For example, when the juvenile seat 14 is in the rearward-facing arrangement, either the second pivot rod 60 or the third pivot rod 62 may extend through either corresponding aperture 21, 23 depending on the position of the pin-movement controller 42. In this situation, the first and fourth pivot rods 58, 64 are offset from the carrier plate 82. As previously discussed, the one of the first and fourth pivot rods 58, 64 are extended when the juvenile seat 14 is in this position, but the carrier plate 82 will not pivot about this rod because it is offset from the carrier plate 82.

In the illustrative embodiment, the first and second apertures 21, 23 are keyed apertures each having a circular portion 150 configured to receive the rod base 140A, 140B, 140C, 140D of one of the pivot rods, a first key portion 152, and a second key portion 154. The first and second key portions 152, 154 align with the rod flange 142A, 142B, 142C, 142D of one of the pivot rods when the juvenile seat 14 is in the rearward-facing arrangement, the forward-facing arrangement, the first pivoted arrangement, and the second pivoted arrangement. The rod flanges 142A, 142B, 142C, 142D block the pivot rods from extending and retracting through the apertures 21, 23 when the juvenile seat 14 is not in the rearward-facing arrangement, the forward-facing arrangement, the first pivoted arrangement, or the second pivoted arrangement to control when the rod-movement controller 42 is able to move between the first and second positions.

In illustrative embodiments, the child restraint 10 further includes a seat-lock system 46 configured to block movement of the juvenile seat 14 about each pivot axis 24, 26, 28, 30. The seat-lock system 46 is normally arranged in a locked position and assumes the locked position once the juvenile seat reaches the rearward-facing arrangement, the forward-facing arrangement, the first pivoted arrangement, or the second pivoted arrangement. The seat-lock system 46 includes a release handle 160 coupled to the juvenile seat 14, one or more seat attachment members 162 coupled to the juvenile seat 14 and/or the juvenile-seat carrier 18, and one or more seat anchors 164 coupled to the seat base 12 as shown in FIG. 6. The release handle 160 is configured to be actuated to release the one or more seat attachment members 162 from the one or more seat anchors 164 to allow the juvenile seat 14 to pivot about the selected pivot axis. The attachment members 162 can include one or more hooks, latches, bars, ledges, etc. coupled to the release handle 160 for movement therewith. The seat anchors 164 can include one or more bars, catches, slots, ledges, etc. coupled to the seat base 12.

In the illustrative embodiment, the lock system 46 includes separate attachment members and anchors for the forward-facing arrangement and the rearward-facing arrangement. In the forward-facing arrangement, seat attachment members 162 located on a backrest of the juvenile seat 14 engage with seat anchors 164 located on a seat base 12. In the rearward-facing arrangement, a second seat attachment member 163 coupled to the seat mount 80 engages with a second seat anchor 165 located below the other seat anchors on the seat base 12. The second seat attachment member 163 interlocks with the second seat anchor 165 in the rearward-facing arrangement to block movement of the juvenile seat 14 and the seat mount 80 away from the seat base 12.

The second seat attachment member 163 and the second seat anchor 165 are structured to allow pivoting of the juvenile seat 14 from the first and second pivoted arrangements to the rearward-facing arrangement from axes 26 and 28 and vice versa. The seat anchor 165 has a first curved segment 166 and a second curved segment 167. The first curved segment 166 is curved about a line 168 with a center at pivot axis 26. The second curved segment 167 is curved about a line 169 with a center at pivot point 28. This allows the seat attachment member 163 to interlock with the seat anchor 165 when pivoting from the first pivoted arrangement to the rearward-facing arrangement or from the second pivoted arrangement to the rearward-facing arrangement as suggested in FIGS. 24-26. The second seat attachment member 163 has a complementary shape to first curved segment 166 and second curved segment 167.

In some embodiments, the second seat anchor 165 is integrated into a belt lock off 171 that is pivotable relative to the seat base 12 to open and close a belt path 173. An attachment belt is configured to be routed across the belt path 173. The belt lock off 11 then clamps down on the attachment belt in the belt path 173 to secure the seat base to a vehicle seat. The second seat anchor 165 is formed with the belt lock off 171 directly forward of the belt path 173 so that loads acting on the second seat anchor 165 from the second seat attachment member 163 are transferred directly to the attachment belt.

It should be noted that, in some embodiments, one or more of the pivot axes 24, 26, 28, 30 can be omitted. For example, pivot axes 26, 28 located at or near a front of the seat base 12 or pivot axes 24, 30 located near a rear of the seat base 12 may be the only axes used to pivot the juvenile seat 14 relative to the seat base 12. The juvenile seat 14 may not pivot to the first or second pivoted arrangements from the forward-facing arrangement because children may be old/large enough to enter and exit the juvenile seat 14 by themselves. In some embodiments, the juvenile seat 14 can also pivot or rotate about a central axis located in a generally central location of a bottom of the seat base 12 to allow the juvenile seat 14 to pivot between the forward-facing and rearward-facing arrangements.

Another embodiment of a child restraint 210 in accordance with the present disclosure, is shown in FIGS. 28-44. The child restraint 210 includes a seat base 212 and a juvenile seat 214 coupled to the seat base 212 and adapted to hold and secure a child 11 for transportation in the vehicle 100. The juvenile seat 214 is pivotable relative to the seat base 212 to move the juvenile seat 214 and the child 211 seated in the juvenile seat 214 from a position inside a cabin 102 of the vehicle 100 to a position that is at least partially outside of a door 104 of the vehicle 100. When the juvenile seat 214 is partially outside of the vehicle door 104, a caregiver can easily place or remove the child 11 in and out of the juvenile seat 214 without leaning through the vehicle door 104 and into the vehicle cabin 102.

The juvenile seat 214 is pivotable relative to at least a portion of the seat base 212 by multi-axis pivoting means 216 incorporated in the seat base 212. The multi-axis pivoting means 216 allows the juvenile seat 214 to pivot about multiple axes between four arrangements depending on the size of the child seated on the juvenile seat and the side of the vehicle 100 that the child restraint 10 is installed. The pivoting means 216 allows the juvenile seat 214 to move between a forward-facing arrangement in which the child 11 faces the front 106 of the vehicle 100 for relatively larger children, and a rearward-facing arrangement in which the child 11 faces the rear 108 of the vehicle 100 for relatively smaller children. The pivoting means 216 also allow the juvenile seat 214 to move to a first pivoted arrangement in which the child 11 faces laterally toward the driver side 110 of the vehicle 100, and a second pivoted arrangement in which the child 11 faces laterally toward the passenger side 112 of the vehicle 100. One out of up to four total pivot axes 224, 226, 228, 230 can be selected and established by reconfiguring the pivoting means 16 so that the juvenile seat 214 is able to pivot from either the forward-facing arrangement or the rearward-facing arrangement to either the first or second pivoted arrangement.

The pivoting means 216 includes a juvenile-seat carrier 218 configured to couple with the juvenile seat 214 for movement therewith, a seat-pivot controller 220 configured to position the juvenile seat 214 in one of the four arrangements described above, and a pivot-axis selector 222 configured to engage the seat-pivot controller 220 to establish one out of the four possible pivot axes 224, 226, 228, 230 about which the juvenile seat 214 pivots. The juvenile-seat carrier 218 is fixed to a portion of the seat-pivot controller 220 and may include one or more attachment members that allow the juvenile seat 214 to be separated from the seat base 212 and the juvenile-seat carrier 218. The seat-pivot controller 220 controls and guides pivoting movement of the juvenile seat 214 and the juvenile-seat carrier 218 between the forward-facing and rearward-facing arrangements and the first and second pivoted arrangements depending on a position of the pivot-axis selector 222. A caregiver can selectively reposition the pivot-axis selector 222 relative to the seat-pivot controller 220 to engage a selected pivot axis 224, 226, 228, 230 to cause the juvenile seat 214 to pivot to the first or second pivoted arrangement about the selected pivot axis 224, 226, 228, 230 depending on where the caregiver has installed the child restraint 210 (i.e. on the passenger side or the driver side).

It should be noted that, in some embodiments, one or more of the pivot axes 224, 226, 228, 230 can be omitted. For example, pivot axes 226, 228 located at or near a front of the seat base 212 may be the only axes used to pivot the juvenile seat 214 relative to the seat base 212. These axes 226, 228 are used when the juvenile seat 214 is in the rearward-facing arrangement to allow the juvenile seat 214 to pivot to the first or second pivoted arrangement when the child is relatively small and cannot enter or exit the juvenile seat by themselves. The juvenile seat 214 may not pivot the first or second pivoted arrangements from the forward-facing arrangement because children may be old/large enough to enter and exit the juvenile seat 214 by themselves. In some embodiments, the juvenile seat 214 can also pivot or rotate about a central axis located in a generally central location of a bottom of the seat base 212 to allow the juvenile seat 214 to pivot between the forward-facing and rearward-facing arrangements.

In the illustrative example, the seat-pivot controller 220 includes a center plate 232 positioned at a center of the seat base 212, a seat-base plate 234 that cooperates with the center plate 232 to define a carrier pathway 236 for the juvenile-seat carrier 218, and an axle receiver 38 coupled to the juvenile-seat carrier 218 for movement therewith. In the illustrative embodiment, the carrier pathway 236 has a star-like shape with pointed ends aligning with each of the four arrangements for the juvenile seat 214. The axle receiver 238 is formed to include a pair of axle-receiving apertures 240 which are configured to selectively engage with the pivot-axis selector 222 to establish the selected pivot axis 224, 226, 228, 230 about which the juvenile seat 214 pivots. In the illustrative embodiment, the axle receiver 238 is partially sandwiched between the center plate 232 and the seat-base plate 234.

The pivot-axis selector 222 includes four axis-defining axles 242, 244, 246, 248, a frame 250, and an axis-selection handle 252. Each of the axis-defining axles 242, 244, 246, 248 provides a respective pivot axis 224, 226, 228, 230 about which the juvenile seat 214 is pivotable when a selected axis-defining axle 242, 244, 246, 248 is received in the aperture 240 of the axle receiver 238. The frame 250 interconnects the four axis-defining axles 242, 244, 246, 248 to cause each of the axis-defining axles 242, 244, 246, 248 to move in unison with one another. The axis-selection handle 252 may be engaged by the care giver to allow the caregiver to move the frame 250 so a selected axis-defining axle 242, 244, 246, 248 engages with the axle receiver 238 handle 252 to establish the pivot axis 224, 226, 228, 230 about which the juvenile seat 214 pivots.

The frame 250 and each of the axles 242, 244, 246, 248 are movable to four different positions relative to the seat-pivot controller 220 to move one of the axles 242, 244, 246, 248 into engagement with the axle receiver 38 and activate selectively one of the pivot axes 224, 226, 228, 230. The frame 250 is configured to move to a first position where a first axis-defining axle 242 is engaged with the axle receiver 38 to establish a first pivot axis 224. When the frame is in the first position, the juvenile seat 214 is pivotable about the first pivot axis 224 from the forward-facing arrangement to the first pivoted arrangement so that the caregiver can move the child 11 in and out of the juvenile seat 214 on the driver side 110 of the vehicle 100.

The frame 250 is configured to move to a second position where a second axis-defining axle 244 is engaged with the axle receiver 38 to establish a second pivot axis 26. When the frame is in the second position, the juvenile seat 214 is pivotable about the second pivot axis 226 from the rearward-facing arrangement to the first pivoted arrangement so that the caregiver can move the child 11 in and out of the juvenile seat 114 on the driver side 110 of the vehicle 100.

The frame 250 is configured to move to a third position where a third axis-defining axle 246 is engaged with the axle receiver 238 to establish a third pivot axis 228. When the frame is in the third position, the juvenile seat 214 is pivotable about the third pivot axis 228 from the forward-facing arrangement to the second pivoted arrangement so that the caregiver can move the child 11 in and out of the juvenile seat 214 on the passenger side 112 of the vehicle 100.

The frame 250 is configured to move to a fourth position where a fourth axis-defining axle 248 is engaged with the axle receiver 38 to establish a fourth pivot axis 230. When the frame is in the fourth position the juvenile seat 214 is pivotable about the fourth pivot axis 230 from the rearward-facing arrangement to the second pivoted arrangement so that the caregiver can move the child 11 in and out of the juvenile seat 214 on the passenger side 112 of the vehicle 100.

The axis-selection handle 252 may be gripped by a caregiver to move the frame 250 and the axles 242, 244, 246, 248 between the four positions. In some embodiments, the axis-selection handle 252 includes a single trigger 254 that, when squeezed, unlocks the pivot-axis selector 222 to control both forward-rearward movement and side-side movement of the frame 250 the axles 242, 244, 246, 248. For example, if a caregiver desires to change the juvenile seat 214 from the forward arrangement to the rearward arrangement on the driver side 110, then the caregiver would squeeze the front trigger 254 to move the frame 250 forward so the axle receiver 238 engages the second axis-defining axle 244 rather than the first axis-defining axle 242. In other words, the frame 250 is moved from the first positon to the second position. Allowing the caregiver to adjust the juvenile seat 214 between different arrangements allows for the caregiver to utilize the pivoting means 216 to easily remove the child 11 from the juvenile seat 214 whether the juvenile seat 214 needs to be forward or rearward facing, or on the passenger side 112 or driver side 110 of the vehicle 100.

In some embodiments, the axis-selection handle 252 may include a front trigger 254 coupled to the front of the seat base 212 and a rear trigger or handle 256 coupled to the back of the seat base 212. The front trigger 254 may control frontward-rearward movement of the frame 250. The rear trigger 256 may control side-side movement of the frame 250. The rear trigger 256 may be hidden and inaccessible when the child restraint 210 is installed on the vehicle seat so that frame 250 cannot be moved to switch between the first and second pivoted arrangements without first uninstalling the child restraint 10 from the vehicle seat 100.

The seat-base plate 236 may further include movement restrictors 258, 260 which cooperate with movement restrictors 262, 264 of the juvenile-seat carrier 218 to restrict forward and backward movement of the juvenile seat 214 when juvenile seat 214 is in the forward-facing or rearward-facing arrangement. The movement restrictors 262, 264 may also be used to attach the juvenile seat 214 to the juvenile-seat carrier 218.

The invention claimed is:

1. A child restraint comprising a seat base, a juvenile seat coupled to the seat base and adapted to hold and secure a child for transportation in a vehicle, and pivoting means for pivoting a seat-pivot unit configured to control movement of the juvenile seat relative to the seat base to move the juvenile seat about a plurality of pivot axes between a forward-facing arrangement in which the child faces the front of the vehicle, a rearward-facing arrangement in which the child faces the rear of the vehicle, a first pivoted arrangement in which the child faces a first lateral side of the vehicle and is placed on a driver side of the vehicle, and a second pivoted arrangement in which the child faces an opposite second lateral side of the vehicle and is placed on a passenger side of the vehicle to cause the juvenile seat to extend at least partially outside of a door of the vehicle in the first pivoted arrangement and the second pivoted arrangement so that a caregiver can place or remove the child into or out of the juvenile seat without leaning through the door of the vehicle and into the cabin of the vehicle, wherein the seat-pivot unit comprises:

a carrier plate coupled to the seat base and configured to guide movement of the juvenile seat relative to the seat base between the forward-facing arrangement, the rearward-facing arrangement, the first pivoted arrangement, and the second pivoted arrangement, a plurality of pivot rods configured to engage selectively with the carrier plate, and a rod actuator configured to move each of the pivot rods included in the plurality of pivot rods relative to the seat base to cause a single pivot rod included in the plurality of pivot rods to engage with the carrier plate to establish a pivot axis included in the plurality of pivot axes about which the juvenile seat is configured to rotate relative to the seat base.

2. The child restraint of claim 1, wherein the rod actuator includes:

a first rod carrier having a first end coupled to a first pivot rod included in the plurality of pivot rods and an opposite, second end coupled to a second pivot rod included in the plurality of pivot rods, a second rod carrier spaced apart from the first rod carrier and having a first end coupled to a third pivot rod included in the plurality of pivot rods and an opposite, second end coupled to a fourth pivot rod included in the plurality of pivot rods, and a rod-movement controller coupled to the first and second rod carriers and movable relative to the seat base between a first position, in which one of the first pivot rod and the third pivot rod engages the carrier plate, and a second position, in which one of the second pivot rod and the fourth pivot rod engages the carrier plate.

3. The child restraint of claim 2, wherein the rod-movement controller includes a selector knob configured to be gripped and moved by a user to move the rod-movement controller between the first and second positions, a first cam coupled to the first rod carrier, a second cam coupled to the second rod carrier, and a selector axle coupled to the selector knob and coupled to the first and second cams to cause simultaneous movement of the first and second cams and simultaneous movement of the first and second rod carriers in response to movement of the selector knob between the first and second positions.

4. The child restraint of claim 3, wherein the rod-movement controller is pivotable about a controller axis established by the selector axle between the first and second positions, and wherein the first and second rod carriers are each configured to pivot about a common axis in response to the rod-movement controller pivoting about the controller axis.

5. The child restraint of claim 4, wherein the first rod carrier is configured to pivot in a first direction about the common axis in response to the selector axle moving from the first position to the second position to cause the first pivot rod to extend toward the carrier plate and the second pivot rod to retract away from the carrier plate, and the second rod carrier is configured to pivot in a second direction, opposite the first direction, in response to the selector axle moving from the first position to the second position to cause the third pivot rod to extend toward the carrier plate and the fourth pivot rod to retract away from the carrier plate.

6. The child restraint of claim 1, wherein the seat base includes a bottom wall, a top wall spaced apart from the bottom wall to provide a first cavity between the bottom wall and the top wall, and a guide plate spaced apart from the top wall to provide a second cavity between the top wall and the guide plate and separated from the first cavity by the top wall, and wherein the rod actuator is received in the first cavity and the carrier plate is received in the second cavity.

7. The child restraint of claim 6, wherein the top wall is formed to include a first opening corresponding to the first pivot rod, a second opening corresponding to the second pivot rod, a third opening corresponding to the third pivot rod, and a fourth opening corresponding to the fourth pivot rod, and wherein each of the pivot rods is configured to extend into the second cavity when engaged with the carrier plate and retract into the first cavity when disengaged from the carrier plate.

8. The child restraint of claim 7, wherein the first and third pivot rods extend through the first and third openings into the second cavity when the rod-movement controller is in the first position and retract out of the second cavity and into the first cavity when the rod-movement controller is in the second position, and the second and fourth pivot rods extend through the second and fourth openings when the rod-movement controller is in the second position and retract out of the second cavity and into the first cavity when the rod-movement controller is in the first position.

9. A child restraint comprising a seat base, a juvenile seat coupled to the seat base and defining a child-receiving space adapted to hold and secure a child for transportation in a vehicle, and a seat-pivot unit configured to mount the juvenile seat to the seat base and control movement of the juvenile seat relative to the seat base, wherein the juvenile seat is pivotable relative to the seat base about a plurality of pivot axes between a forward-facing arrangement in which the child-receiving space faces a first direction, a rearward-facing arrangement in which the child-receiving space faces a second direction opposite the first direction, a first pivoted arrangement in which the child-receiving space faces a third direction between the first and second directions, and a second pivoted arrangement in which the child-receiving space faces a fourth direction between the first and second directions and away from the third direction, wherein the plurality of pivot axes includes a first pivot axis, a second pivot axis, a third pivot axis, and a fourth pivot axis, and wherein the first pivot axis, the second pivot axis, the third pivot axis, and the fourth pivot axis are offset from a longitudinal centerline of the seat base.

10. The child restraint of claim 9, wherein the first pivot axis, the second pivot axis, the third pivot axis, and the fourth pivot axis are offset from a lateral centerline of the seat base.

11. The child restraint of claim 9, wherein the seat pivot unit comprises:

a carrier plate coupled between the seat base and the juvenile seat and configured to guide movement of the juvenile seat relative to the seat base between the forward-facing arrangement, the rearward-facing arrangement, the first pivoted arrangement, and the second pivoted arrangement, a plurality of pivot rods configured to engage selectively with the carrier plate, and a rod actuator configured to move each of the pivot rods included in the plurality of pivot rods relative to the seat base to cause a single pivot rod included in the plurality of pivot rods to engage with the carrier plate to establish a pivot axis included in the plurality of pivot axes about which the juvenile seat is configured to rotate relative to the seat base.

12. The child restraint of claim 11, wherein the rod actuator includes:

a first rod carrier having a first end coupled to a first pivot rod included in the plurality of pivot rods and an opposite, second end coupled to a second pivot rod included in the plurality of pivot rods, a second rod carrier spaced apart from the first rod carrier and having a first end coupled to a third pivot rod included in the plurality of pivot rods and an opposite, second end coupled to a fourth pivot rod included in the plurality of pivot rods, and a rod-movement controller coupled to the first and second rod carriers and movable relative to the seat base between a first position, in which one of the first pivot rod and the third pivot rod engages the carrier plate, and a second position, in which one of the second pivot rod and the fourth pivot rod engages the carrier plate.

13. The child restraint of claim 12, wherein the rod-movement controller includes a selector knob configured to be gripped and moved by a user to move the rod-movement controller between the first and second positions, a first cam coupled to the first rod carrier, a second cam coupled to the second rod carrier, and a selector axle coupled to the selector knob and coupled to the first and second cams to cause simultaneous movement of the first and second cams and simultaneous movement of the first and second rod carriers in response to movement of the selector knob between the first and second positions, and wherein the rod-movement controller is pivotable about a controller axis established by the selector axle between the first and second positions, and wherein the first and second rod carriers are each configured to pivot about a common axis in response to the rod-movement controller pivoting about the controller axis.

14. The child restraint of claim 11, wherein the seat base includes a bottom wall, a top wall spaced apart from the bottom wall to provide a first cavity between the bottom wall and the top wall, and a guide plate spaced apart from the top wall to provide a second cavity between the top wall and the guide plate and separated from the first cavity by the top wall, and wherein the rod actuator is received in the first cavity and the carrier plate is received in the second cavity.

15. A child restraint comprising a seat base, a juvenile seat coupled to the seat base and defining a child-receiving space adapted to hold and secure a child for transportation in a vehicle, and a seat-pivot unit configured to mount the juvenile seat to the seat base and control movement of the juvenile seat relative to the seat base, wherein the juvenile seat is pivotable relative to the seat base about: (i) a first pivot axis from a rearward-facing arrangement to a first pivoted arrangement in which the child-receiving space faces in a first lateral direction, and (ii) a second pivot axis from the rearward-facing arrangement to a second pivoted arrangement in which the child-receiving space faces in a second lateral direction opposite the first lateral direction, wherein the seat pivot unit comprises:

a carrier plate coupled between the seat base and the juvenile seat and configured to guide movement of the juvenile seat relative to the seat base between the forward-facing arrangement, the rearward-facing arrangement, the first pivoted arrangement, and the second pivoted arrangement, a plurality of pivot rods configured to engage selectively with the carrier plate, and a rod actuator configured to move each of the pivot rods included in the plurality of pivot rods relative to the seat base to cause a single pivot rod included in the plurality of pivot rods to engage with the carrier plate to establish a pivot axis included in the plurality of pivot axes about which the juvenile seat is configured to rotate relative to the seat base.

16. The child restraint of claim 15, wherein the first pivot axis and the second pivot axis are offset from a longitudinal centerline of the seat base.

17. The child restraint of claim 15, wherein the rod actuator includes:

a first rod carrier having a first end coupled to a first pivot rod included in the plurality of pivot rods and an opposite, second end coupled to a second pivot rod included in the plurality of pivot rods, a second rod carrier spaced apart from the first rod carrier and having a first end coupled to a third pivot rod included in the plurality of pivot rods and an opposite, second end coupled to a fourth pivot rod included in the plurality of pivot rods, and a rod-movement controller coupled to the first and second rod carriers and movable relative to the seat base between a first position, in which one of the first pivot rod and the third pivot rod engages the carrier plate, and a second position, in which one of the second pivot rod and the fourth pivot rod engages the carrier plate.

18. The child restraint of claim 17, wherein the rod-movement controller includes a selector knob configured to be gripped and moved by a user to move the rod-movement controller between the first and second positions, a first cam coupled to the first rod carrier, a second cam coupled to the second rod carrier, and a selector axle coupled to the selector knob and coupled to the first and second cams to cause simultaneous movement of the first and second cams and simultaneous movement of the first and second rod carriers in response to movement of the selector knob between the first and second positions.

19. The child restraint of claim 18, wherein the rod-movement controller is pivotable about a controller axis established by the selector axle between the first and second positions, and wherein the first and second rod carriers are each configured to pivot about a common axis in response to the rod-movement controller pivoting about the controller axis.

20. The child restraint of claim 15, wherein the seat base includes a bottom wall, a top wall spaced apart from the bottom wall to provide a first cavity between the bottom wall and the top wall, and a guide plate spaced apart from the top wall to provide a second cavity between the top wall and the guide plate and separated from the first cavity by the top wall, and wherein the rod actuator is received in the first cavity and the carrier plate is received in the second cavity.

* * * * *